US006822663B2

(12) United States Patent
Wang et al.

(10) Patent No.: US 6,822,663 B2
(45) Date of Patent: Nov. 23, 2004

(54) TRANSFORM RULE GENERATOR FOR WEB-BASED MARKUP LANGUAGES

(75) Inventors: Wayne W. Wang, Los Gatos, CA (US); Joey Chu-Yi Huang, Fremont, CA (US)

(73) Assignee: AdaptView, Inc., Milpitas, CA (US)

( * ) Notice: Subject to any disclaimer, the term of this patent is extended or adjusted under 35 U.S.C. 154(b) by 507 days.

(21) Appl. No.: 09/768,732

(22) Filed: Jan. 24, 2001

(65) Prior Publication Data

US 2002/0035579 A1 Mar. 21, 2002

Related U.S. Application Data

(60) Provisional application No. 60/232,448, filed on Sep. 12, 2000.

(51) Int. Cl.[7] .................................................. G06F 3/00
(52) U.S. Cl. ...................................... 345/854; 345/733
(58) Field of Search ................................. 345/733, 751, 345/740, 854, 847, 853; 709/246, 217, 220, 221, 218; 5/259, 762, 765, 281; 375/85.3

(56) References Cited

U.S. PATENT DOCUMENTS 5,675,752 A * 10/1997 Scott et al. ................. 345/765
6,230,168 B1 * 5/2001 Unger et al. ................ 707/501
6,278,449 B1 * 8/2001 Sugiarto et al. ............. 345/765
6,430,624 B1 * 8/2002 Jamtgaard et al. .......... 709/246
6,457,030 B1 * 9/2002 Adams et al. ............... 715/523
6,643,652 B2 * 11/2003 Helgeson et al. ............ 707/10

* cited by examiner

*Primary Examiner*—Cao (Kevin) Nguyen
(74) *Attorney, Agent, or Firm*—McAndrews, Held & Malloy, Ltd.

(57) ABSTRACT

An apparatus and method for use in transforming existing web pages (or other information) for display (playback or the like) on associated web enabled Internet appliances. For display materials, a graphical editing tool is provided that allows a web designer to pull up source content pages wherein the information components are identified and assigned an identifier. The identified components are graphically arranged into a result area according to the capabilities of the receiving web enabled appliance. A set of transformation rules is generated according to the graphically arranged result. These rules are then used by a server device to transform the requested source information as it is requested by the web enabled appliance. The rules can be stored and applied by a device, including a proxy server device, that requests the source content material from a web server and then responds with the transformed information via application of the set of transformation rules.

26 Claims, 30 Drawing Sheets

Figure 20

| Image Attribute | | |
|---|---|---|
| Filter | False | |
| ⊙ Replace By Image | | |
| ⊙ Replace By Text | | |
| ⊙ Replace By Alt | | |
| Link | | |
| Reset | Advancd | |
| Name | | |
| Width | | |
| Height | | |
| Src | | |
| LowSrc | | |
| Align | left | |
| Vspace | | |
| Hspace | | |
| Style | | |
| Border | | |
| Dither | | |

(B)

| Image Attribute | | |
|---|---|---|
| Filter | False | |
| ⊙ Replace By Image | | |
| ⊙ Replace By Text | True | |
| ⊙ Replace By Alt | | |
| Link | | |
| Reset | Advancd | |
| Name | | |
| Width | | |
| Height | | |
| Src | | |
| Align | top | |
| Vspace | | |
| Hspace | | |
| Image format | wbmp | |
| Dither | | |

(A) Hot Spot Attribute

| Filter | False ▼ |
| Replaced By Image | |
| Replaced By Alt | |
| Replaced By Text | |
| Align | right ▼ |
| Link | |
| Reset | Advanced |
| B I U E S A A A | |

(B) Hot Spot Attribute

| Filter | False ▼ |
| Replaced By Image | |
| Replaced By Text | |
| Replaced By Alt | |
| Align | left ▼ |
| Link | |
| Reset | Advanced |
| Coord | |
| Shape | |
| Target | |
| Map Name | |
| B I U E S | |

(C) Map Attribute

| Filter | False ▼ |
| Resize the whole map | No ▼ |
| Map src: | |
| Img src: | |
| Align | left ▼ |
| Reset | Advanced |

TRANSFORM RULE GENERATOR FOR WEB-BASED MARKUP LANGUAGES

RELATED APPLICATIONS

The present application claims priority of the Provisional application entitled "Automatic Transform Rule Generation for Web-Based Markup Languages," filed on Sep. 12, 2000, by the inventors Wang et al., and assigned Ser. No. 60/232, 448, which is hereby incorporated by reference in its entirety.

FIELD OF THE INVENTION

A transform rule generator apparatus and method for use in transforming existing web pages (or other information) for display (or playback) in association with multiple Internet appliances such as computers, mobile phones, personal data assistants (PDAs), television set-top boxes, and the like.

BACKGROUND OF THE INVENTION

The Internet is generally comprised of a distributed network of computers, wherein web servers on the network provide web sites that contain pages of information pertaining to various topics, businesses, and/or ventures. These web pages are provided to a web enabled device in response to a request for this information. Each web page generally has a unique URL (Universal Resource Locator) associated with it. A web enabled device such as a computer can send an HTML (Hypertext Markup Language) request for this URL to the web server. The web server then returns the page of web information in the general format that has been created by the web page designer in creating the information layout for that website (and its associated pages).

When PCs (personal computers) and the like are being used to request the information via a browser, no translation of the information generally needs to take place, as a browser running on a PC (with a full display) is the typical recipient of such web page information. Many new web enabled devices, however, do not have the display capabilities of a standard browser running on a full-display PC. If a standard web page were to be displayed on a device without sufficient display space, the web page information might not be completely visible and/or information might be lost. The information might also spill outside the bounds of the smaller display area, and therefore necessitate excessive scrolling (via browser functions, or the like) in order to view certain parts of the information. In general, the web page designer has no control over how the web page content will appear on the display device.

As a result, web designers have found it necessary to provide for the display of information contained within web pages of a web site on multiple Internet appliances. One such approach (herein referred to as the "duplication" approach) requires the web designer to provide a different set of web resources for each device type that might request the web page information. For example, the web designer would need to design and create a one set of web pages for a PC with a full display, another set of web pages for a mobile phone device, and still another set for a PDA device. This duplication approach might also necessitate the separate web servers and URLs for each device type. In general, the duplication approach has at least the following drawbacks and limitations: (1) The duplicative effort in creating so many different web pages is labor intensive, in that the approach needs extra web designers and programmers for each device type involved. (2) It is generally hard to change web page style, and a redesign is generally required of all the pages and/or programs. (3) It is hard to synchronize web content among different devices. (4) It is difficult to scale for many device types (as a redesign generally needs to be done for each device).

Still another approach is referred to as the "general program approach." According to this approach, some companies have developed general purpose programs to transform web pages for display on different device types. As such, the program generally transforms the web pages according to device capability. The transform is thereafter globally applied on all pages. At least one major limitation of this approach is that the web designer does not have sufficient control over the transformed layout. The transformation result generally depends upon the target device capability, meaning that the resulting page may not meet the requirements of the web designer.

What is therefore needed in the field of art is a web transformation device or tool that allows a web designer to quickly and conveniently generate a set of web pages via transformation rules according to a desired web layout. A graphical web page editor might be provided to operate on existing web pages, thereby allowing the web designer to graphically layout a page according to any of a variety of display characteristics or constraints. The graphical result might then be used to generate a set of transformation rules that can be stored and thereafter applied to the web page if a request comes in to a web server from a particular device.

SUMMARY OF THE INVENTION

The present invention provides an efficient and powerful apparatus and method for transforming existing web pages for display and use with a multitude of Internet appliances, such as PCs, mobile phones, PDAs, and television set-top boxes. The present invention provides a graphical editor that allows the designer to lay out device-specific web pages based upon original web pages that might comprise a web site. The editor thereafter generates transform rules for this specific device at the end of editing. When web pages are requested by the specific device, the pages are transformed dynamically with the set of rules and displayed on the requesting device in a format intended by the designers.

The present invention eliminates certain disadvantages associated with the prior approaches described above. For instance, there is only web page set for the web site. The designer instead creates a different set of stylized sheets for each device. Since there is only one set of content materials, there are no resultant synchronization and scalability issues. The present invention provides a graphical web page editor to generate the transform rules, which allows a web designer to have control over the final page result, no matter what device is used to request and display that material. The editor also reduces the time and cost involved in creating several sets of web pages and programs.

Accordingly, one aspect of the present invention allows for the web designers to design a transform result, such as content, layout, and file format by using the graphical web page editor. The editor allows for original web pages to be pulled up and graphically rearranged to produce the desired transformation display result.

Another aspect of the present invention provides for generation and saving of the transform rules as derived from the designed display result, and not necessarily the page content. The page content can therefore be changed, but the transformed result will be displayed properly.

Another aspect of the present invention allows the transform rules to be applied to new web content and different web pages. This further reduces web design time.

Another aspect of the present invention provides for the transformation of web pages in real time, according to the transformation rules, in order to adopt current web content and adjust to various device capabilities.

Another aspect of the present invention provides for an apparatus for the generation and application of a set of rules to transform source content into result content for a content receiving device, the apparatus comprising: a source content area for retrieving the source content; an analyzer for identifying separate elements within the source content and assigning an identifier to each element; a result content area providing selective placement of the elements according to a desired layout; a rule generator for generating a set of transformation rules for transforming the source content into the result content according to their selective placement; and an application device for applying the transformation rules to the source content that is requested by the content receiving device.

Another aspect of the present invention provides a graphical design apparatus for transforming source content to result content according to the display capabilities of a result content receiving device, the apparatus comprising: a first display area for displaying the source content; a second display area for displaying the result content; a set of graphical tools whereby the source content can be graphically moved with the tools from the first area to the second area to form a result layout; and a rule generator for generating a set of transformation rules to transform the source content to the result layout, the rules being formed according to use of the graphical tools and the result layout.

Another aspect of the present invention provides for a method for providing information content according to the capabilities of a receiving device, the method comprising: retrieving source information content; arranging result information content from the source information content according to the capabilities of the receiving device; generating transformation rules according to the transformation between the source information content and the result information content; and applying the appropriate transformation rules to the source information content when the content is requested by the receiving device.

These and other aspects and advantages of the present invention will become apparent upon reading the following detailed descriptions and studying the various figures of the drawings.

BRIEF DESCRIPTION OF THE DRAWINGS

Certain aspects and advantages of the present invention will be apparent upon reference to the accompanying description when taken in conjunction with the following drawings, which are exemplary, wherein:

FIGS. 20A–20B are display screens, according to one aspect of the present invention, which show example text attribute windows.

FIGS. 21A–21B are display screens, according to one aspect of the present invention, which show example image attribute windows.

FIGS. 22A–22C are display screens, according to one aspect of the present invention, which show example image map attribute windows.

FIGS. 23A–23B are display screens, according to one aspect of the present invention, which show example table attribute windows.

FIG. 24 are display screens, according to one aspect of the present invention, which show script attribute windows.

FIG. 25 are display screens, according to one aspect of the present invention, which show object attribute windows.

FIGS. 26A–26B are display screens, according to one aspect of the present invention, which show audio attribute windows.

DESCRIPTION OF THE PREFERRED EMBODIMENTS

The present invention provides an apparatus and method for generating (in an automated manner, as desired or otherwise) a set of transformation rules that can be applied to source content material to provide result content material according to the capabilities of a device that is requesting the source content material. While the examples below are generally described in terms of visual display materials, other materials (i.e., sound, text, tables, data, etc.) are also intended to be enabled for playback/use on target receiving devices via the transformation process.

In the representative visual display embodiment described below, a graphical editor is provided that analyzes the source content material and assigns an identifier to each element. Certain editing functions are provided which allow a user to perform actions upon the identified elements, and in particular allow for the arrangement of a result according to the capabilities of a target receiving device. Thereafter, a set of transformation rules are generated from the resulting layout and/or editing actions performed by the user. These transformation rules are stored for application to the source content material when it is requested by the receiving device.

The present invention describes the general techniques for performing these functions in terms of web-oriented devices, include web pages, web servers, web sites, and network related examples. Accordingly, a set of source web pages are customized into resulting display pages using the graphical editing tool and command features therein. A set of transformation rules are created therefrom and applied to the source material by a proxy server device. The proxy server device receives requests from a web-enabled device, retrieves the requested source material from the appropriate web server, and then transforms the source material into the appropriate format for the receiving device, by applying the appropriate transformation rules. Note that while the examples below pertain to web and/or network devices, the techniques described herein are intended to be applicable across other fields of art, wherein source material is to be transformed into resulting material for use by a receiving device.

Figure 1:
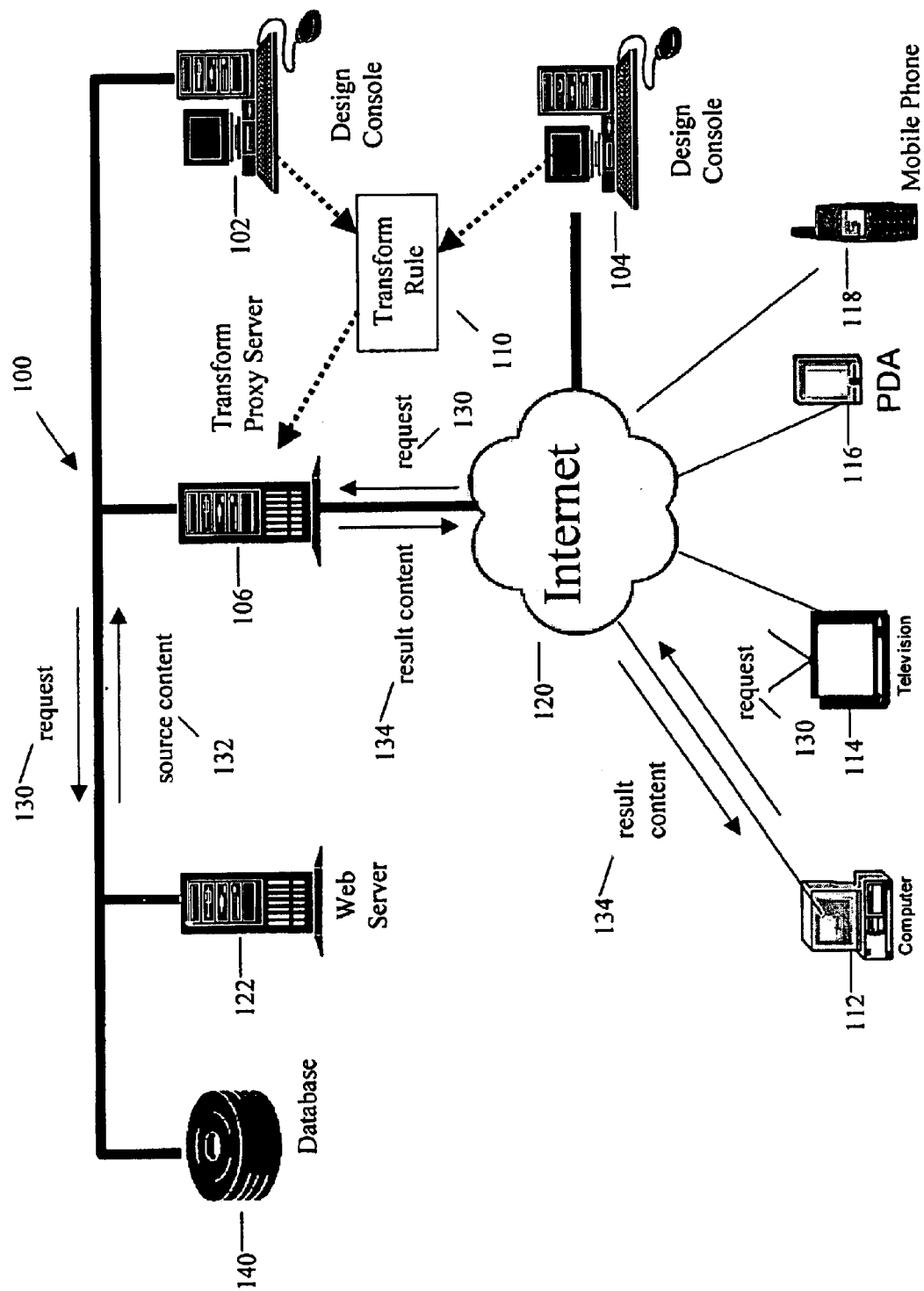
FIG. 1 is a block diagram, according to one aspect of the present invention, of a representative architecture of the present system.

A generalized representation of the system architecture 100 is shown in FIG. 1. Two primary components of the system include the Design Console(s) 102 and 104, and the Transform Proxy server 106. Design console 102 is shown interacting directly with the Transform Proxy Server 106 via a hardwire connection or the like. Design console 104 is shown interacting with the Transform Proxy Server 106 through the Internet 120. Each Design Console includes a graphic web page editor, which allows designers to design and lay out a resultant page for a specified web enabled device. The editor then automatically (or upon user command) generates transform rules 110 in a framework and/or language that can be interpreted along with the web content information in order to reproduce the web page. The transform rules 110 are communicated to the Transform Proxy Server 106. The rules can be stored on the Transform Proxy Server 106, or on an associated storage device such as the shown database 140 (or the like). The rules can be efficiently stored and retrieved via common techniques including databasing, hash table lookups, and so forth.

An example framework and language for generating the transformation rules include Resource Description Framework (RDF) and Extensible Style Language (XSL). RDF is a general framework used to describe any Internet resource such as a web site and its contents. An RDF description (often referred to as metadata, or "data about data") can include information such as the author(s) of the resource, date of creation or revisions, the organization of the pages on a site (the sitemap), information that describes content, key words for search engine data collection, subject categories, and so forth. XSL (also called Extensible Stylesheet Language) is a language for creating a web page that describes how data sent over the Web using Extensible Markup Language (XML) is to be presented to the user. For example, in an XML page that describes the characteristics of one or more automobiles for an insurance company, a set of open and close "" tags might contain the name of an auto manufacturer. Using XSL, the Web browser can (for example) be instructed to display the auto manufacturer name, its location on a page, and the particular font to be used for display. Both RDF and XSL are W3C (World Wide Web Consortium) standards. The W3C RDF and XSL specifications are hereby incorporated by reference.

Referring again to FIG. 1, a series of example web-enabled devices (112–118) are shown interacting with the Internet 120. The web enabled devices include, but are not limited to, a representative computer 112, television 114, PDA 116, mobile phone 118, and so forth. The associated transform rules are used when one of these devices requests a particular page from the example Web Server 122. Many such web servers might exist on the associated network (e.g., LAN, WAN, Internet, and so forth), and each might use a separate (and/or shared) Transform Proxy server in order to transform the requested page into the display format designed for the particular requesting device.

In the preferred embodiment, each web server (as associated with a web site) uses a separate transform proxy server so that the web server is not further burdened by the task of transforming content material. In operation, a web enabled device such as the computer 112, sends a request 130 through the Internet 120 (or other network communication means) to the Transform Proxy Server 106. The Transform Proxy Server 106 sends the request 130 on to the web server 122. In response, the web server 122 sends back information such as source content to the Transform Proxy Server 106. The source content might originate from the web server 122, or be retrieved from associated storage such as the database 140. As related to the capabilities of the receiving device (112), the appropriate transformation rules 110 (as previously created and stored) are applied to the source content 132 to produce result content 134. The result content is thereafter forwarded through the Internet 120 (or other network communication means) to the receiving device 112. The result content 134 will be viewable in a preferred layout according to the work performed by a designer on the design console (102, 104, and so forth).

Figure 2:
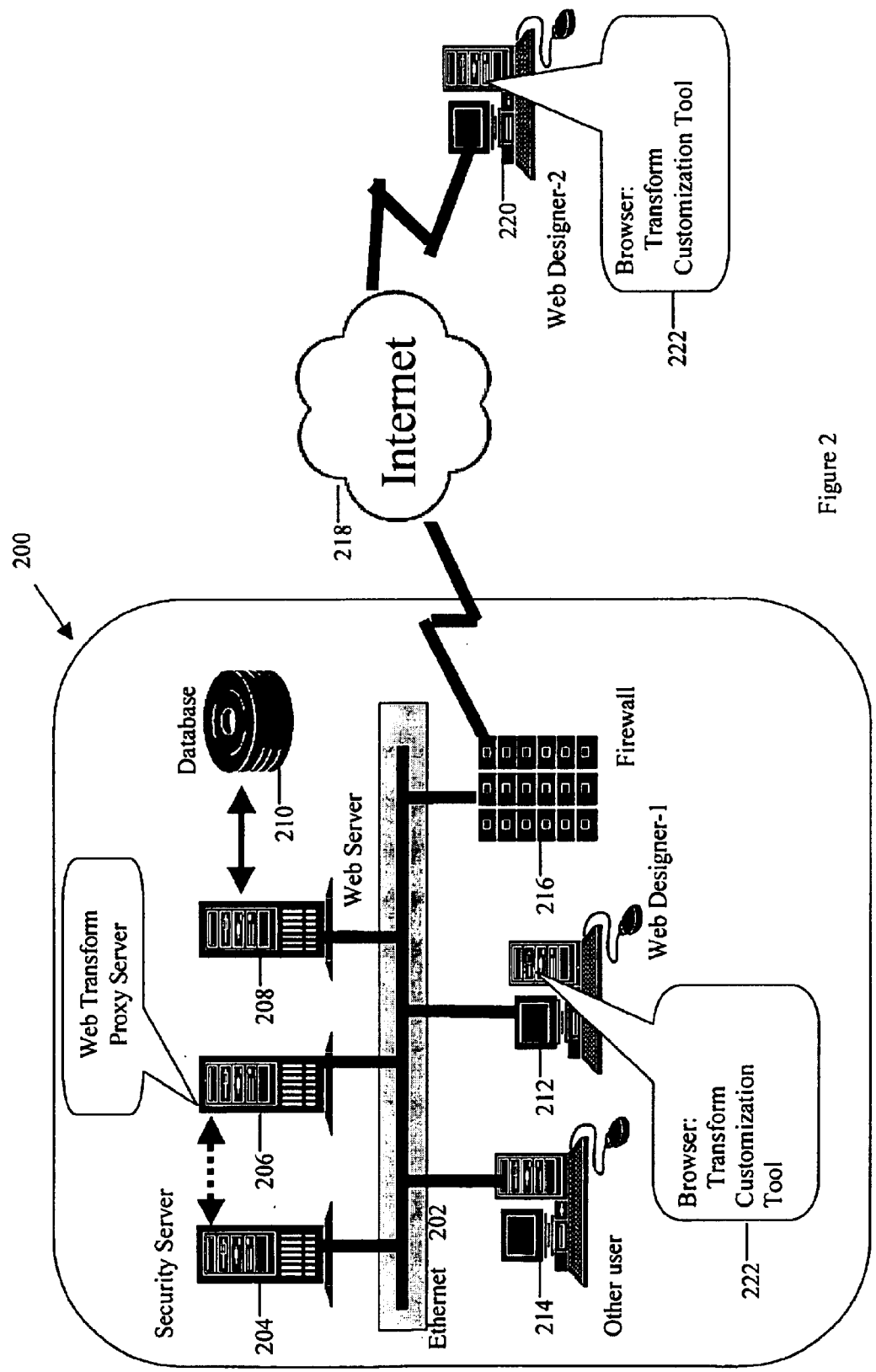
FIG. 2 is a block diagram, according to one aspect of the present invention, of another representative architecture of the present system.

FIG. 2 shows an alternative configuration 200 for connecting certain example devices associated with implementing the present invention. In this configuration 200, an Ethernet connection 202 (or local network) is shown associated with a security server 204, a web transform proxy server 206, a web server 208, and a database 210. The Ethernet connection 202 also shows an example Web Designer-1 212, another user 214, and a firewall 216. Each of these networked components can interact with each other, similar to the manner described above, across the Ethernet connection 202. The security server 204 might provide screening of passwords for users entering the network. The firewall 216 prevents certain data from being accessed (or distributed) via the network connection 202 to outside networks, such as the Internet 218.

A multitude of users can use the system to customize web pages. For example, other users (i.e., 214) might access source content from any of a variety of web servers (208, or the like). Moreover, a remotely connected Web Designer-2 220 might interact through the Internet 218 with the Web Transform Proxy Server 206 via the firewall connection 216 into the Ethernet 202. In either instance, a page customization tool 222 is used to customize the web pages according to the capabilities of the viewing device. Web designers use the tool 222 to customize the web pages, which will in turn generate transform rules to be interpreted by the Web Transform Proxy Server 206.

Figure 3:
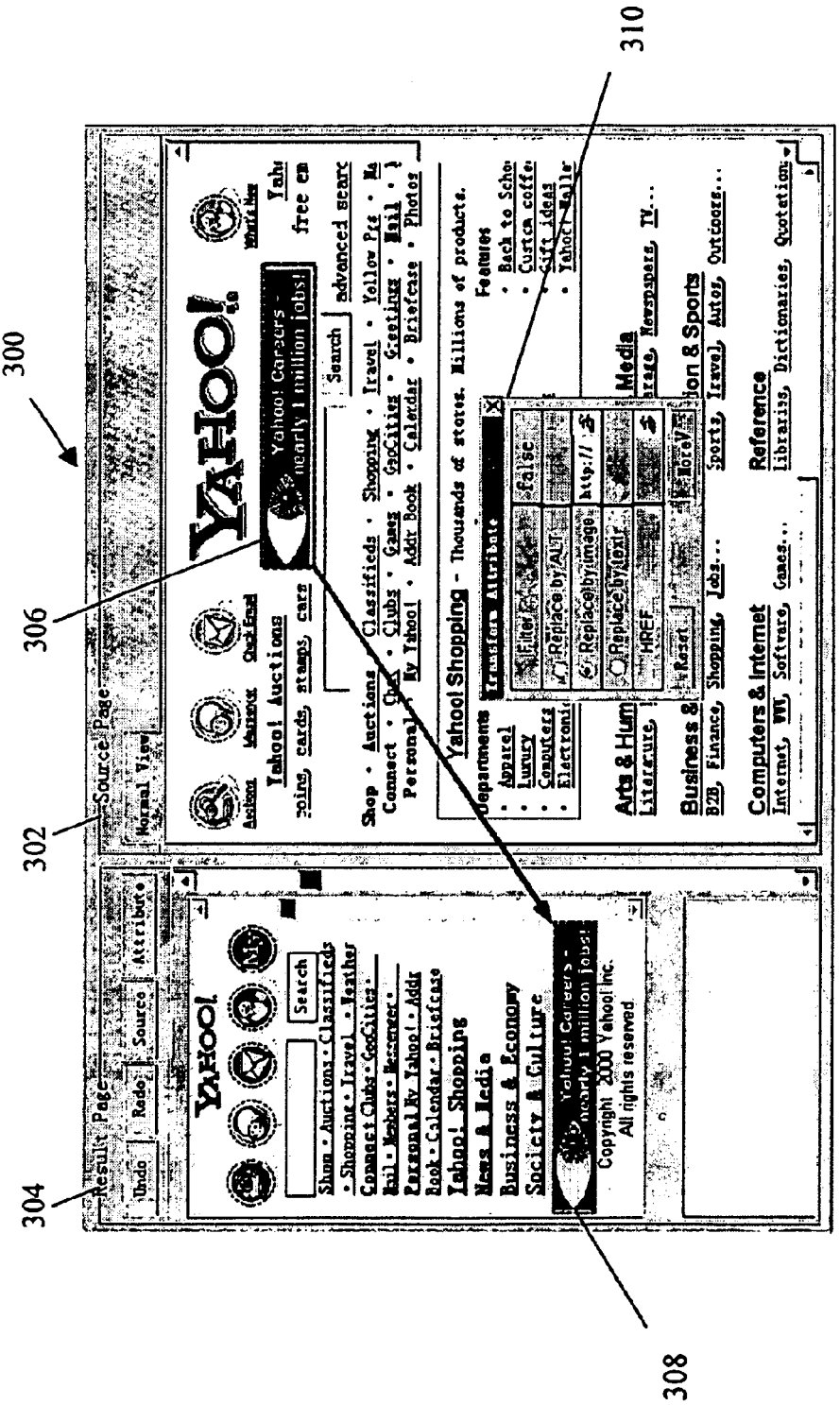
FIG. 3 is a representative display screen, according to one aspect of the present invention, of the page editor.

FIG. 3 next shows a generalized example of a screen 300 that might be associated with the page customization tool 222, or web page editor (or similar device). A source page 302 is shown on the right hand side of the display, while the result page 304 is shown on the left hand side. The dimensions and configuration of the result page are dependent on the device for which the result age is being targeted. The source page is comprised of elements, and the editor associates an identifier with each element. The user can generally drag-and-drop elements from the source (or result) page to the result page. For instance, the advertisement 306 in the source page 302 is an identified element that has been positioned as shown at 308 on the result page 304. An attribute window 310 for updating information that might relate to attributes, values, or some other action relating to transformation of the element. When the end user accesses the web site, the Transform Proxy transforms the requested page for the accessing device according to the generated transform rules.

The transform rule-generating web page editor of the present invention therefor implements or performs at least the following tasks: (1) Analyze the web page and assign each element an identifier (ID). (2) Provide unique editing functions and capture/record user actions (i.e., drag-and-drop). (3) Generate the transform rules resulting from the user actions.

According to step 1, the web page is analyzed and a unique ID is assigned to each visible web page element. If the web page element already has a unique ID, then that original ID is used. If a web page element does not have a unique ID, then one is generated by using the element path. This path might be the same as the XPath in XSL. Examples are provided in the provisional application, which has been incorporated by reference above.

According to step 2, user actions are recorded. When a designer edits a page, this user action can be recorded. An action might be composed of an action type, source operand, and target operand. For representative purposes, categorized action types might include the following, along with an associate command in parentheses: (B) Insert source before target; (A) Insert source after target; (R) Replace target with source; (D) Delete target; (T) Replace target's attribute with new attribute; (V) Replace target's value with new value; (S) Insert source as target's first child; (E) Insert source as target's last child (whereas insert as other child could be expressed by B or A); (P) Insert source at absolute position specified in target. Moreover, an operand might include the following data: From source page or result page; Frame number; Page/Deck number (a source page could be transformed into multiple page/deck); Card number (deck and card are page unit defined in WML or Wireless Markup Language); Element ID; Element value (a mark-up language element has a tag, value, and attribute); and Element attribute.

According to step 3, the transform rules are generated. A web page may contain several URLs pointing to other web frame pages, images and/or audio information. A transform rule is generated for every such URL. The generated rule may include two parts: XSL file and match rule. The XSL file is for markup language files, such as HTML, XML, and WML. This file is not generally needed for images, audio information, and the like. A match rule might include two parts: (1) How to match, i.e., the criteria to search in a transform rule database, including URL, device type, user name, and/or device capabilities. (2) How to transform, i.e., the data needed for transformation including the transform type, including XSL, image, audio, etc., and the transform parameter, including XSL file, image operation parameters (scale size, output format, dither depth, etc.), and audio operation parameters (resample rate, mono/stereo, output format, etc.). Examples of generated XSL transformation code are included in the provisional application, which has been incorporated by reference above. Examples of XSL code templates for each of the editing actions are also included therein.

As described above, the transform rules might be expressed (for instance) in XSL. The Transform Proxy therefor transforms a web page with an appropriate XSL for the target device. Accordingly, the Transform Proxy Server would need at least an XSL processor to do the transformation, and match engine to select the appropriate XSL file. The XSL processor implements the W3C XSL specification to transform the web pages. Additional functionality is incorporated by the present invention to transform image and audio files. The match engine generally needs the page URL, the accessing device type, and the device capability in order to match transform rules. Such data might be retrieved through the following example standards: HTTP (Hyper-Text Transportation Protocol), CC/PP (Composite Capability and Preference Profile), and WAGUAProf (Wireless Application Group User Agent Profile Specification). These standards are hereby incorporated by reference.

Figure 4:
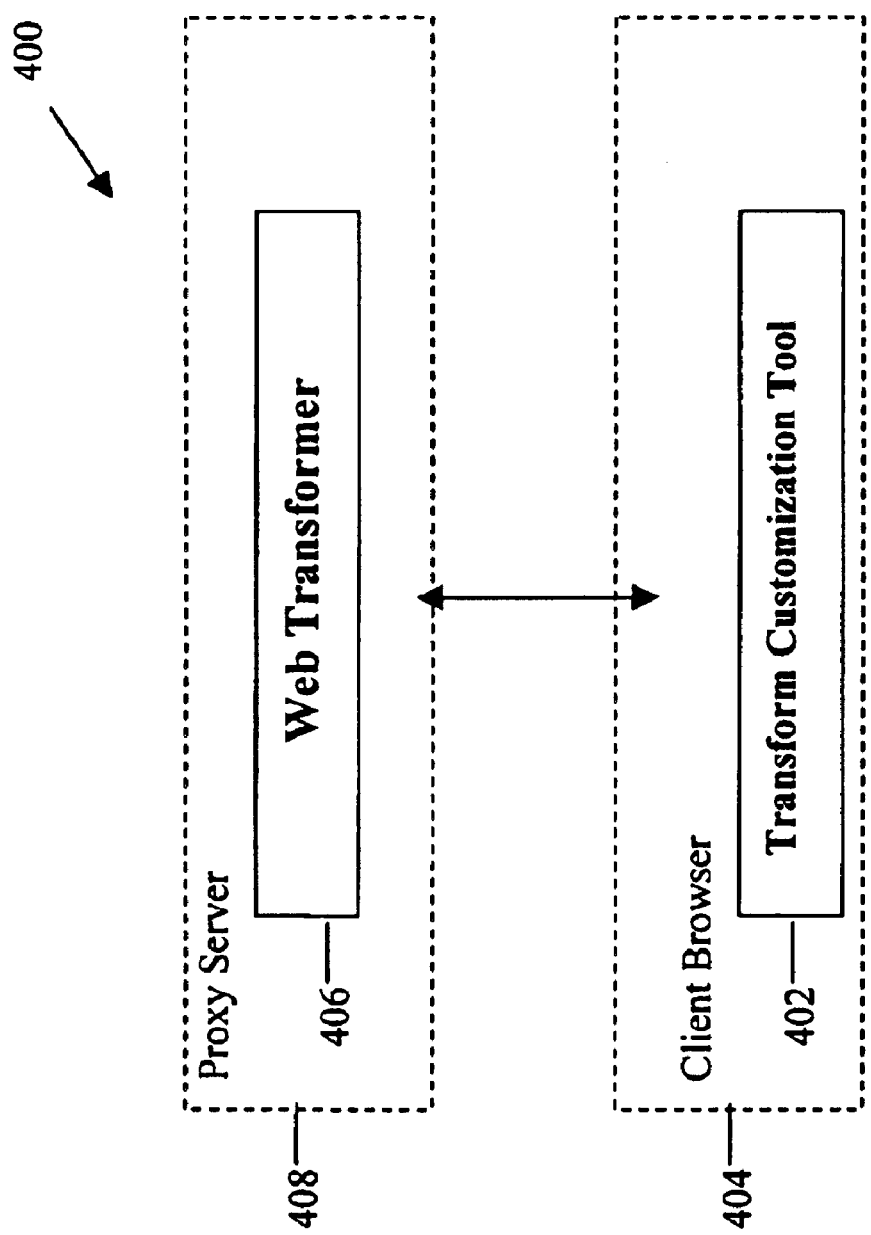
FIG. 4 is a block diagram, according to one aspect of the present invention, of a client browser interacting with a web transform proxy device.

FIG. 4 next shows a block diagram 400 for the page customization (or editing) tool architecture. The page customization tool consists of two parts: (1) a client side page customization tool 402, which runs in the client side browser 404; and (2) a server side web transform proxy 406, which runs on the Transform Proxy Server 408.

Figure 5:
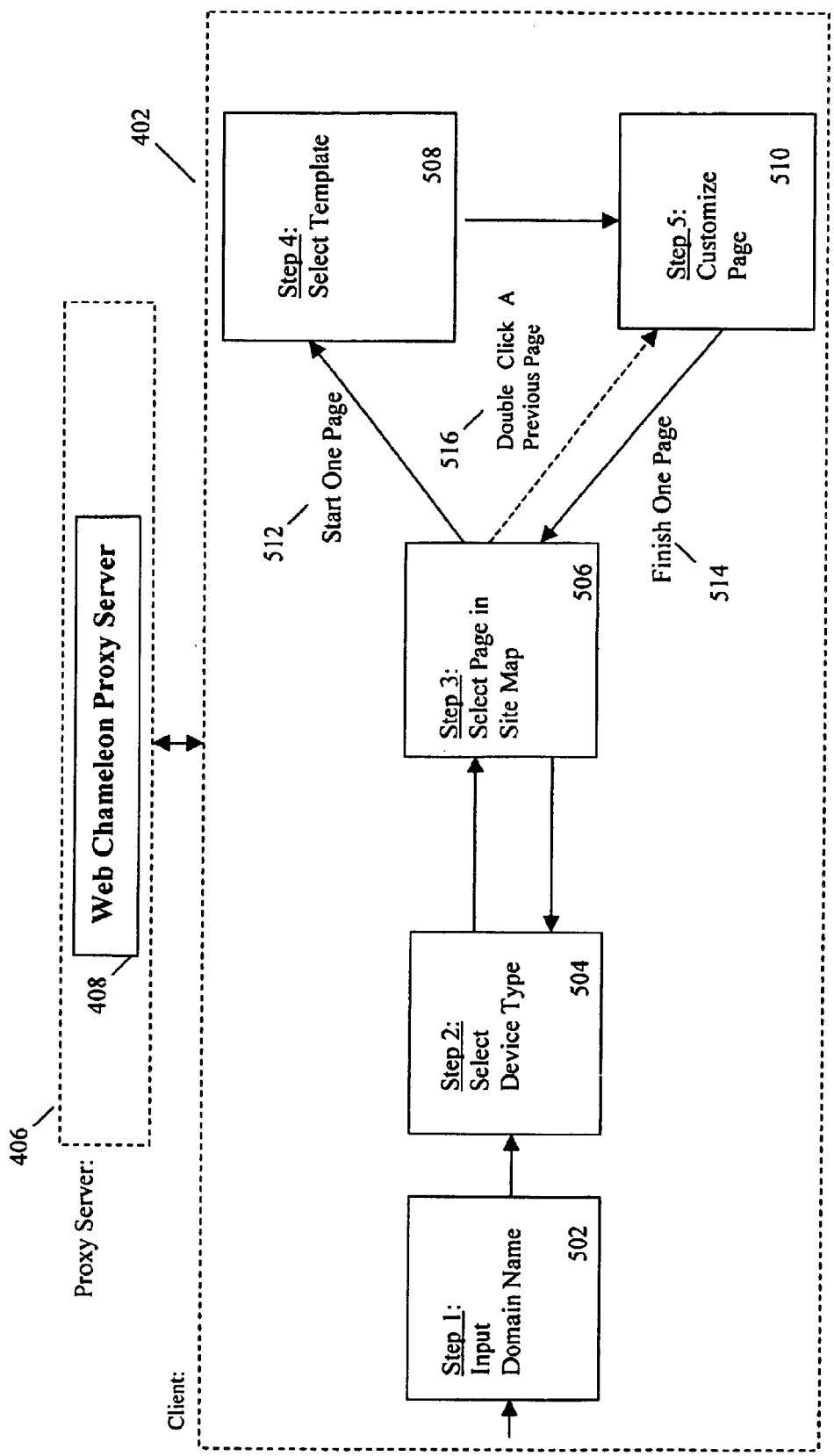
FIG. 5 is a block diagram, according to one aspect of the present invention, of the client browser of FIG. 4 having steps to be performed in the transformation process.

FIG. 5 shows an expansion of the client side page customization tool 402, wherein a five step architecture is described. These architecture steps include: (1) Input domain name 502; (2) Select device type 504; (3) Select page in site map 506; (4) Select Template 508; and (5) Customize page 510. According to this overview, a domain name is first selected (502) by the user for the transformation of source content. The user then needs to select a device type (504) in order to optimize the source content according to the capabilities of the selected device. A site map is presented, and the user can select a page (506) from this site map. The arrow showing "start one page" (512) leads to the step of selecting a template (508). The editor is used to customize the resulting content for the selected display device (510), and the finished page 514 is produced. The user then has the option of selecting another page from the site map and repeating steps 508 and 510 until the site is completed, or the user exits. The double arrow 516 indicates that a user might double-click (or select) a page that has already been customized for further revisions or additions.

Figure 6:
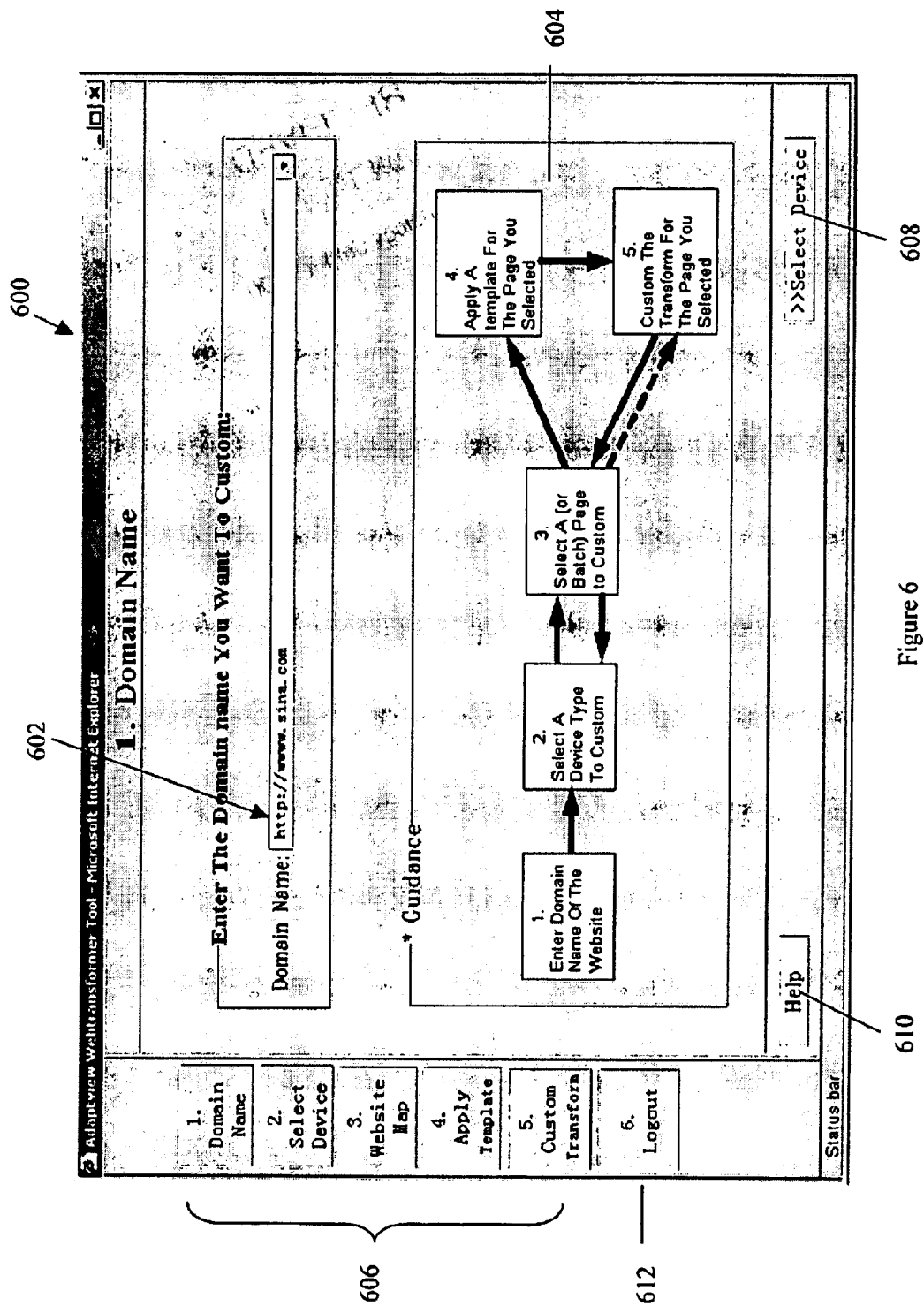
FIG. 6 is a display screen, according to one aspect of the present invention, as associated with selecting a domain name to be displayed and edited.

FIG. 6 shows an example screen 600 which might be used to implement the first step (i.e., element 502 in FIG. 5) of inputting the domain name. Prior to this screen, certain login procedures could have been applied to the user (web designer) in order to limit access to the system only to authorized users. Security measures might be handled by a security server, such 204 shown above. The domain name screen 600 includes a drop-down menu 602 for entering (or locating) the domain name. A guidance area 604 is shown with the steps 1–5 graphically depicted (as above) for user reference. Certain buttons 606 serve as a navigation panel and are displayed on the left to show the states of the five operational steps being performed. A Select Device button 608 and Help button 610 are also shown. The user therefore enters the domain name of the web site that the user wishes to customize. If the user has not typed anything into the domain name edit box (602), then the Select Device button 608 will be disabled. If the user has typed information into the domain edit box, and clicked on the Select Device button, then the program will send the URL/domain name to the corresponding server. The Select Device window (see FIG. 7) will thereafter appear. The Help button 610 opens a separate help window that displays information for the Domain Name screen 600. The logout button 612 invokes a window requesting confirmation of the logout operation. If an incorrect domain name has been entered, then a message will be sent to the user requesting a correction to be entered.

Figure 7:
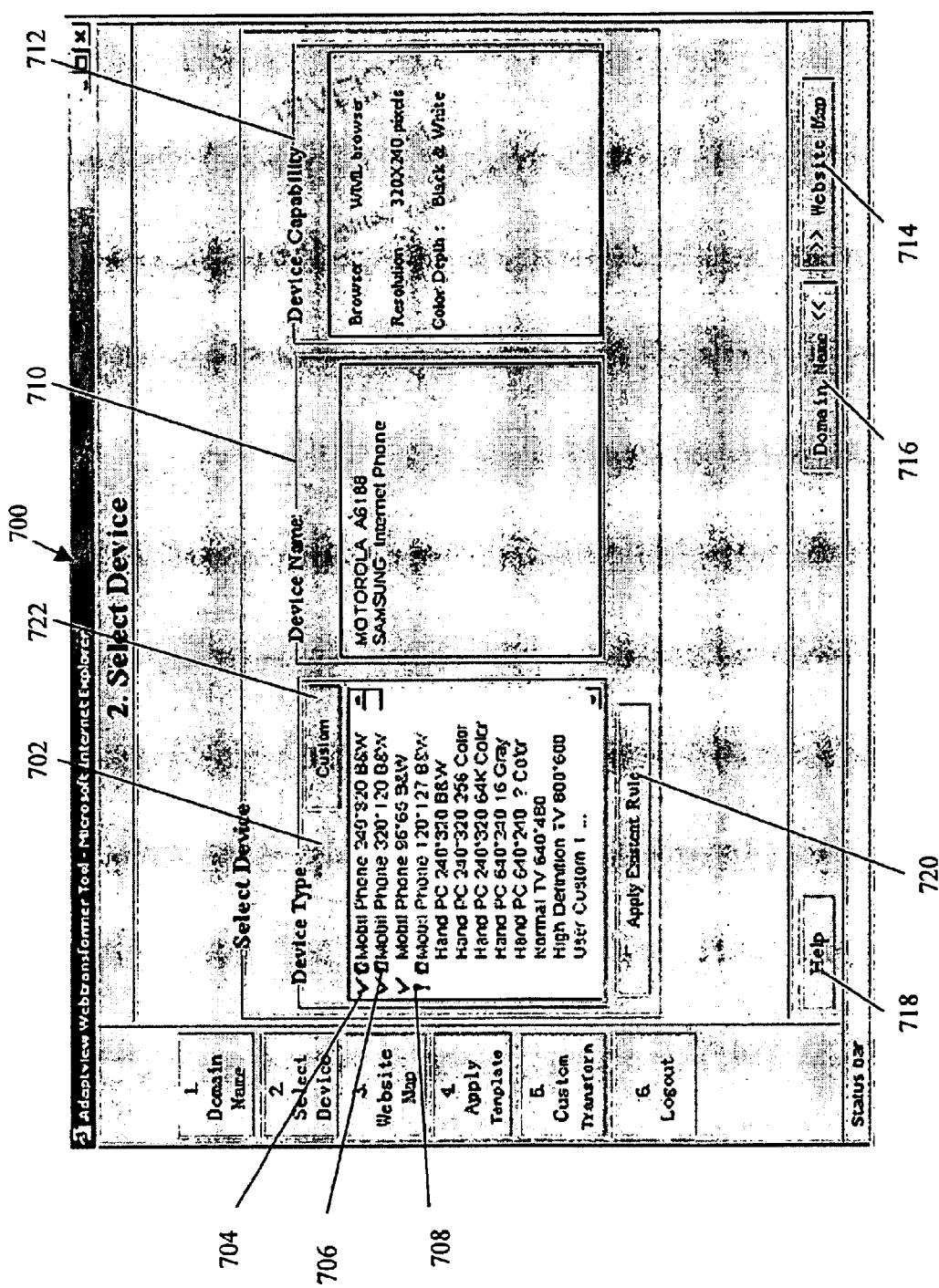
FIG. 7 is a display screen, according to one aspect of the present invention, as associated with selecting a device type for the transformed display results.

FIG. 7 next shows a representative screen 700 associated with the second step of selecting a device type (i.e., element 504 in FIG. 5). A device type list box 702 contains several classified device types, such as mobile phones, hand PCs, and televisions. Different colors might be used to identify the customization status for each device type. For instance, if a web site has been customized for a designated device type, the device type will be listed as blue with a check-mark symbol or icon, as shown by 704. If a web site has been partially customized for a designated device type, then the device type will be listed as red with an exclamation-mark ("!") icon, as shown by 706. If the web site has not been customized at all for any designated device type, then the device type will be listed as black with a head icon 708.

Once a user has selected a device type, the device name frame 710 will show a list of all device names that fall under that device type. A device capability frame 712 will show, in detail, the device capability of the selected device type. For instance, the displayed device capability includes a WML browser, with a resolution of 320×240 pixels, and a color depth of black and white. The first time the program is used, the first device type will automatically be highlighted. In future sessions, the program will (by default) highlight the device chosen during the last session of the user. If the user double-clicks (or selects) a device type, then the site map (see below) for that type will appear.

Further functionality is provided through the buttons "Website map," "Domain name," "Help," and "Apply Rule Set." The button Website map 714 will be disabled if the user has not selected a device type. Otherwise, if the device type has been selected, then the Website map window will appear. If the user clicks on the Domain name button 716, then the domain name window will be reloaded. The Help button 718 opens a separate help window that displays information for using the Select Device window 700.

Figure 8:
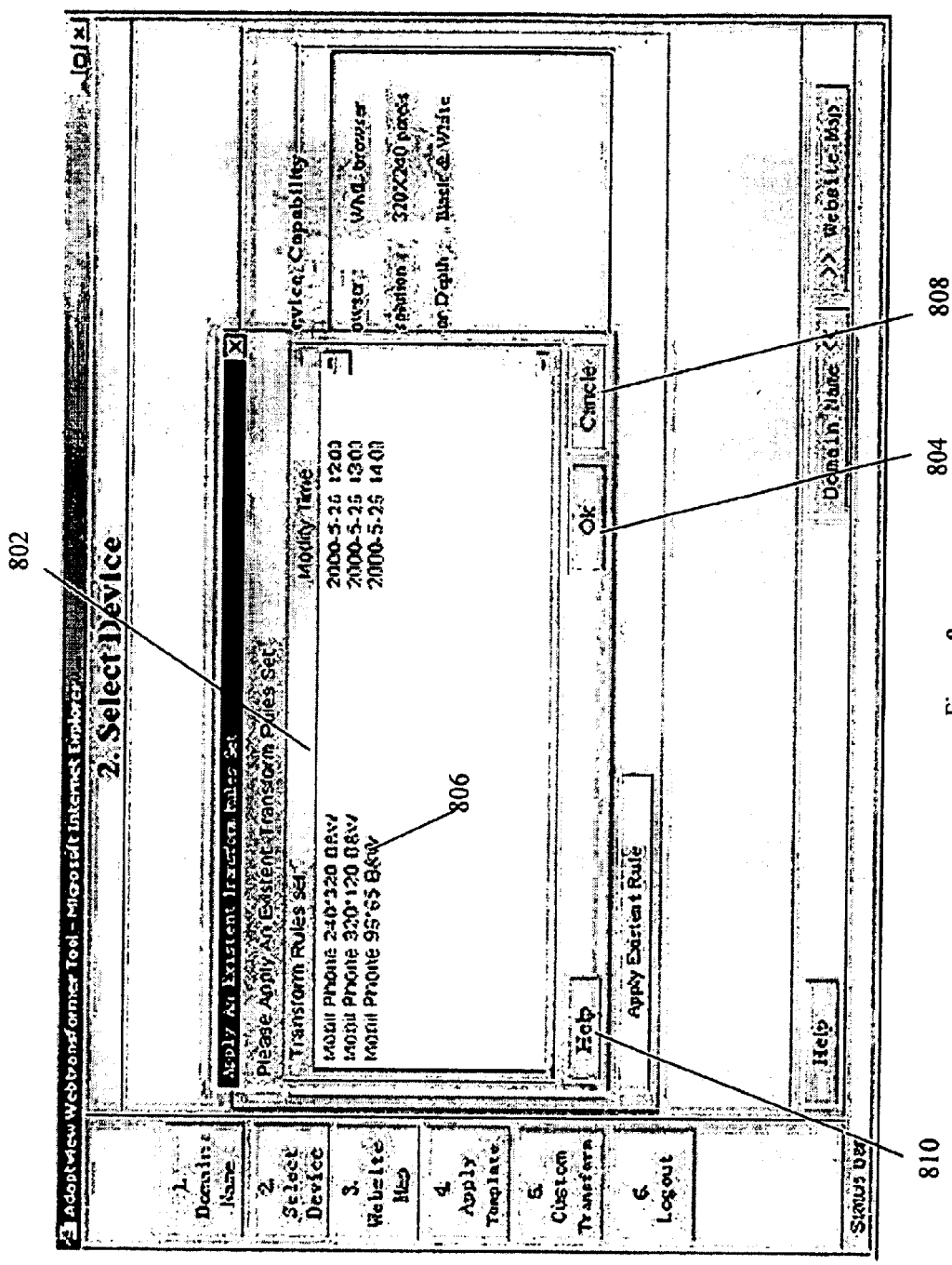
FIG. 8 is a display screen, according to one aspect of the present invention, as associated with applying an existing transform rule set.

If the user clicks on the button 720 labeled "Apply Existing Rule," then the Rule Set window 802 shown in FIG. 8 will appear. If the user clicks "OK" (804), or double-clicks on a rule set, for example 806, then the rule set will be applied to the selected device type and the window 802 will close. This device type will thereafter be labeled with a red check-mark icon. If the user clicks on "Cancel" (808), the Apply Rule Set window 802 will close. If the user clicks on Help 810, then a separate help window will be displayed pertaining to applying the rule set. If the user chooses to apply a rule set to a done, or partially done, device type, a verification message will be provided before the action is completed.

Figure 9:
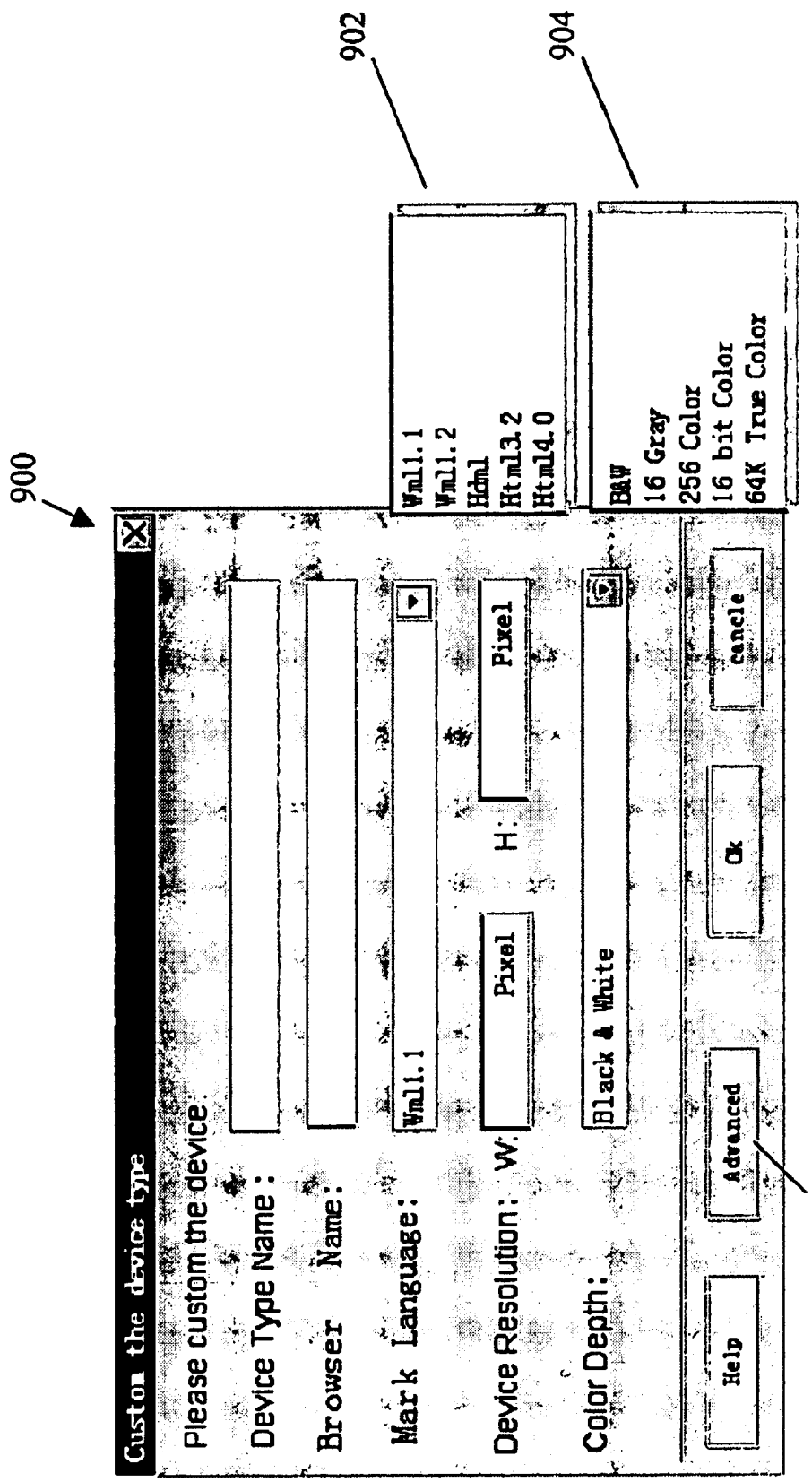
FIG. 9 is a display screen, according to one aspect of the present invention, as associated with customizing a device type.
Figure 10:
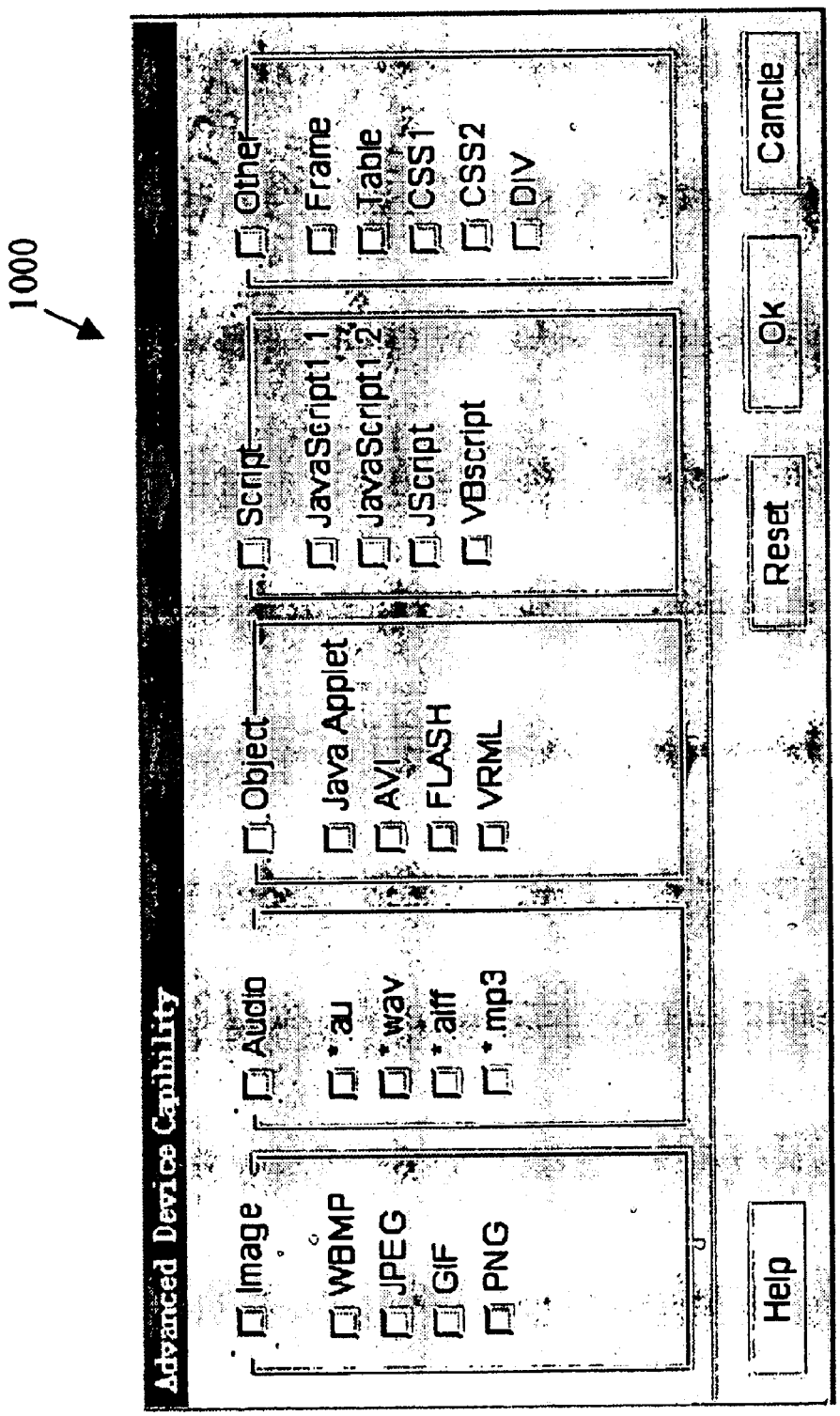
FIG. 10 is a display screen, according to one aspect of the present invention, associated with assigning advanced device capabilities to a customized device.

Referring again to FIG. 7, a "Custom" button 722 is shown. If the user clicks on this button, then a window 900 shown in FIG. 9 will be displayed pertaining to adding a custom device type. This window includes an area for entering the device type name and the browser name. A drop-down menu 902 allows for device language type to be selected. Device resolution can be set for the width and height, as measured in pixels. A drop-down menu 904 allows for selection of the available color depths. The button 906 labeled "Advanced" will further bring up the window 1000 shown in FIG. 10. Various selection boxes are shown for device capabilities relating to image, audio, object, script, and other. By checking the appropriate boxes, the appropriate drivers will be used for the information being sent to the content receiving device.

Figure 11:
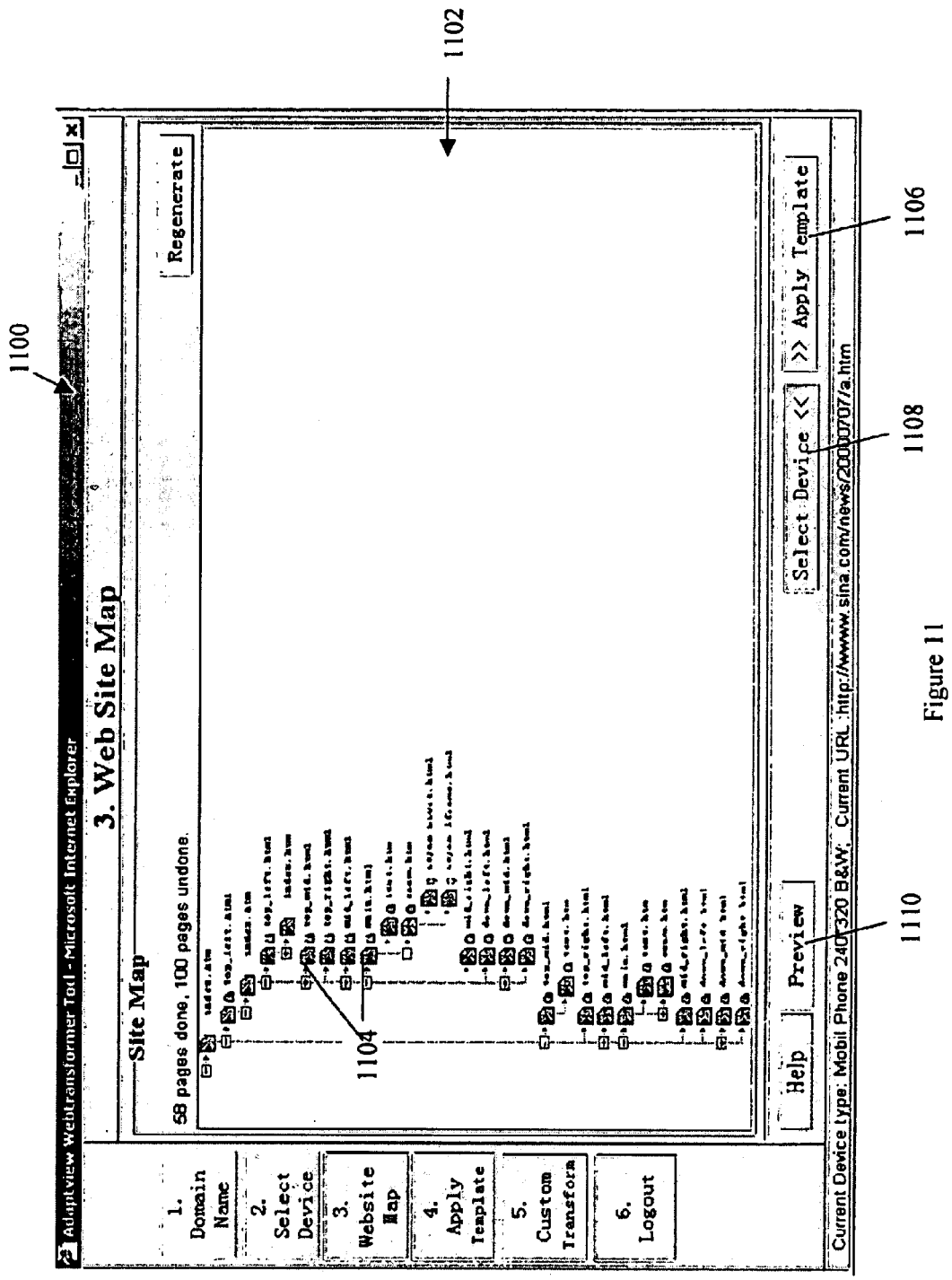
FIG. 11 is a display screen, according to one aspect of the present invention, associated with providing a web site map of pages that have been transformed, or are yet to be transformed.
Figure 12:
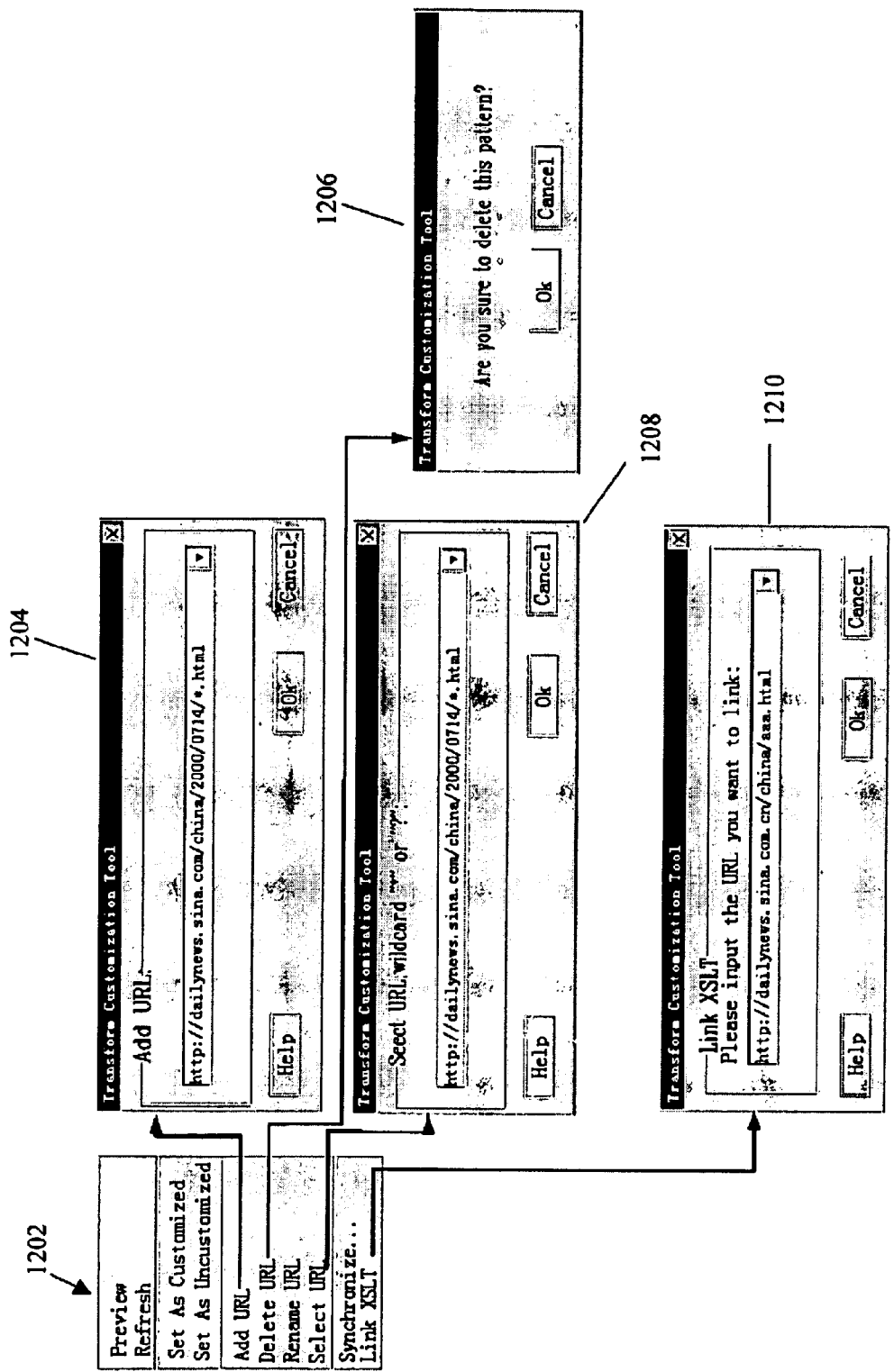
FIG. 12 is a set of display screens, according to one aspect of the present invention, which might be used in association with the web site map.

Step 3 next relates to selecting the page to be customized from the site map (i.e. element 506 in FIG. 5). FIG. 11 shows a representative screen 1100 associated with the web site mapping. The screen includes a site map frame 1102 with a list of site pages. If the site is being customized for this device type for the first time, then the "site map" will show all pages of the original web site. Different colors can be used to identify the customization status of the various web pages. For instance, modified web pages might be blue, unmodified web pages might be red, and pages that the user is currently working on are labeled with a "lock" icon so that multiple users cannot work on the same page. Subpages of a page that is currently being edited might appear in orange, so as to warn other users against editing a subpage that might be potentially deleted by a parent page. Users can select either one page, or a batch of pages to customize. If the user double-clicks on a blue web page, then the "Custom Transform" page (see Step 5 below) will appear. If the user double-clicks on a red web page, then the pages relating to applying a template to the page will appear (see Step 4 below). Pages that are shown in gray cannot generally be opened. The user might scroll through the hierarchy shown in area 1102, with nodes being opened/closed by clicking on the +/− areas 1104.

The button "Apply Template" 1106 will bring up windows pertaining to the next step of selecting and applying a template. If the user has not selected a page or batch of pages, then the button 1106 will be disabled. If the user has selected a page or batch of pages, then the "Apply Template" window of FIG. 13 will appear. The button 1108 labeled "Select Device" allows a user to proceed back to Step 2 and select a device type.

The button 1110 labeled "Preview" is generally disabled if the user has not selected a page. If the user selects a previously untransformed page, and then clicks the button 1110, a request for the page's URL will appear. If the page has not been transformed before, then the program will create and display a default rule to match the page. If the page has been transformed before, then the previously customized rule will appear.

Further functionality might be invoked by a right-click of the mouse buttons in the frame area 1102. As shown in FIG.

12, the menu 1202 will appear, having the example features: Preview—same as described above; Refresh—refreshes the current site map to the client side; Set as Customized—sets an undone page (i.e., shown in red) as a customized page (blue); Set as Uncustomized—sets a customized page (blue) as an uncustomized page (red); Add URL—adds a URL to the selected page; Delete URL—deletes the selected page; Rename URL—allows the user to rename the selected page; Select URL—allows the user to select a page by inputting its URL; Synchronize—synchronizes the work with other users; and Link XSLT—links to a customized page by using its XSLT. By individually selecting features such as Add URL, Delete URL, Select URL, and Link XSLT, the respective windows 1204, 1206, 1208, and 1210 will be displayed to facilitate the functionality. Note that XSLT (XSL Transformations) is a standard way to describe how to transform (change) the structure of an XML (Extensible Markup Language) document into an XML document with a different structure. XSLT is also a recommendation of the World Wide Web Consortium (W3C).

Figure 13:
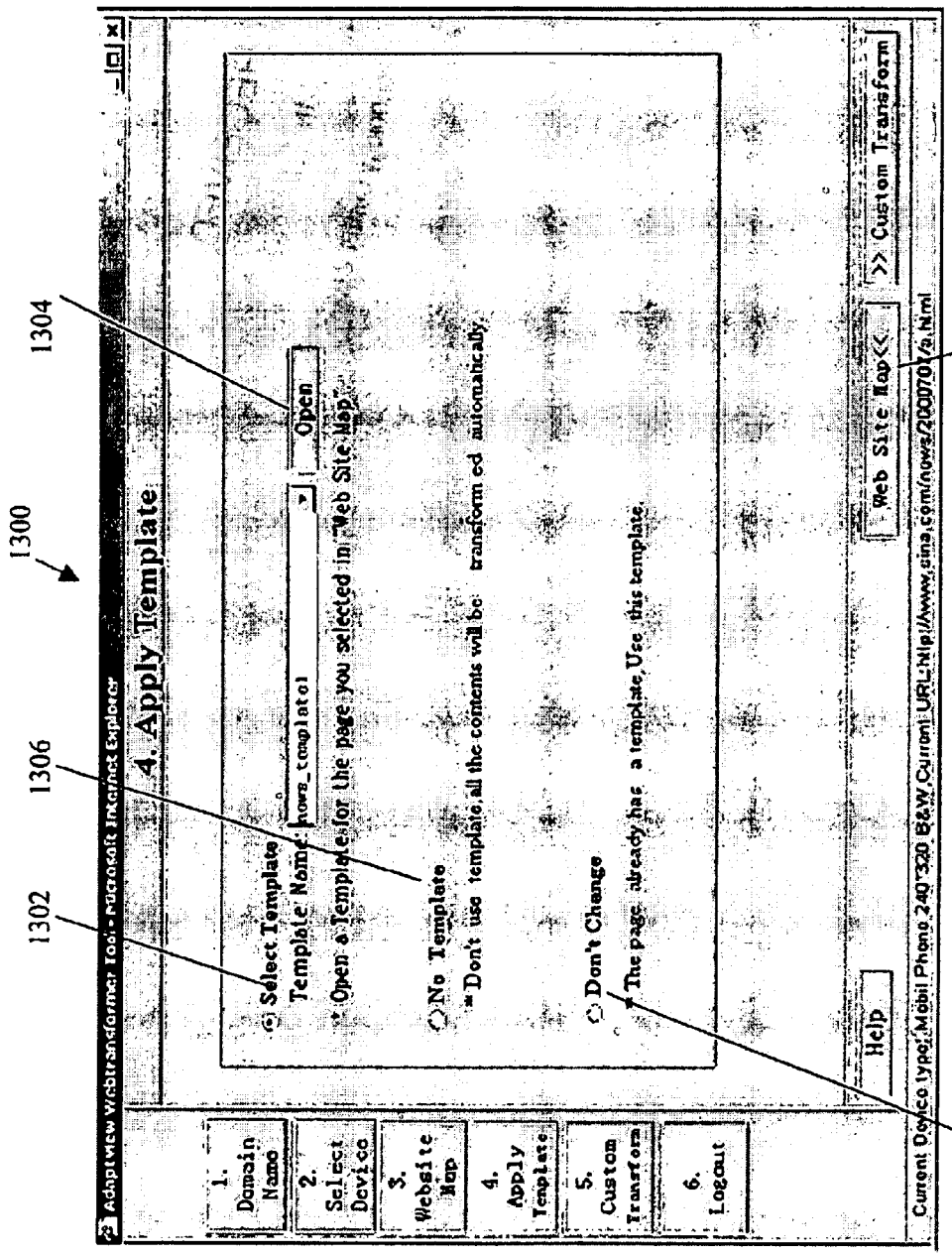
FIG. 13 is a display screen, according to one aspect of the present invention, associated with applying (and selecting) a template to be used in the editor.

The fourth step pertains to the selection and application of a template (i.e., element 508 in FIG. 5) to the result content on the customization page (see below). FIG. 13 shows a representative screen 1300 for implementing certain functionality associated with this step. Certain initial choices are displayed relating to the selection of a template. If the radio button "Select template" 1302 is activated, then a template name can be physically entered and opened by clicking on button 1304. If the "no template" radio button 1306 is activated, then the contents of the source page will be automatically proportioned for the receiving device (i.e., width is greater than or equal to 640, such as for TV). If the "Don't change" radio button 1308 is activated, then the page already has an original template, and that template should be used. Button 1308 is automatically selected if the page has been previously customized, with an appropriate warning screen if the user attempts to change the original template. The button "Web Site Map" 1310 returns to the prior architectural step (i.e., 506 in FIG. 5), and the button "Custom Transform" progresses to the next architectural step (i.e., 510 in FIG. 5).

Figure 14:
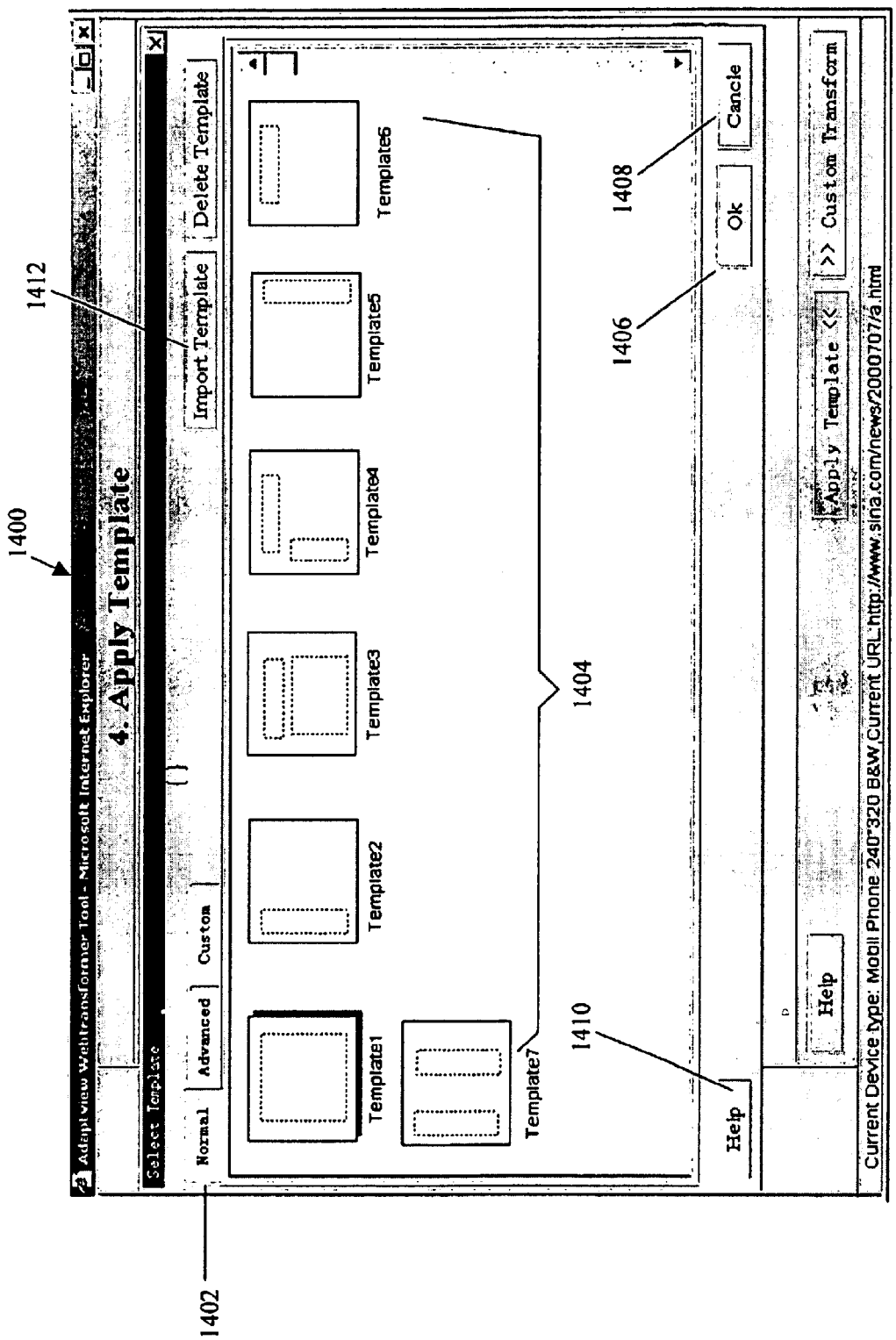
FIG. 14 is a display screen, according to one aspect of the present invention, associated with choosing a template to be applied for use with the editor.

The radio button select template 1302 is automatically set for previously uncustomized pages. When clicked, a separate window 1400 entitled "Select Template" will appear as shown in FIG. 14. This display area includes different folders, such as Normal, Advanced, and Custom for displaying different types of templates. Each folder generally contains gif template files. The templates can be in multiple formats, for instance XSLT and GIF. Templates in the XSLT format are actually used for "real transforming" of the source material to the result material. Templates in the GIF format are for selection by the user. In this particular example, the Normal folder 1402 is selected and seven different types of templates 1404 are shown for user selection. The button "OK" 1406 returns to the Apply Template window in FIG. 13. The button "Cancel" 1408 closes the window used to open a template. The button "Help" 1410 opens a separate help window that displays information for the Select Template window 1400.

Figure 15:
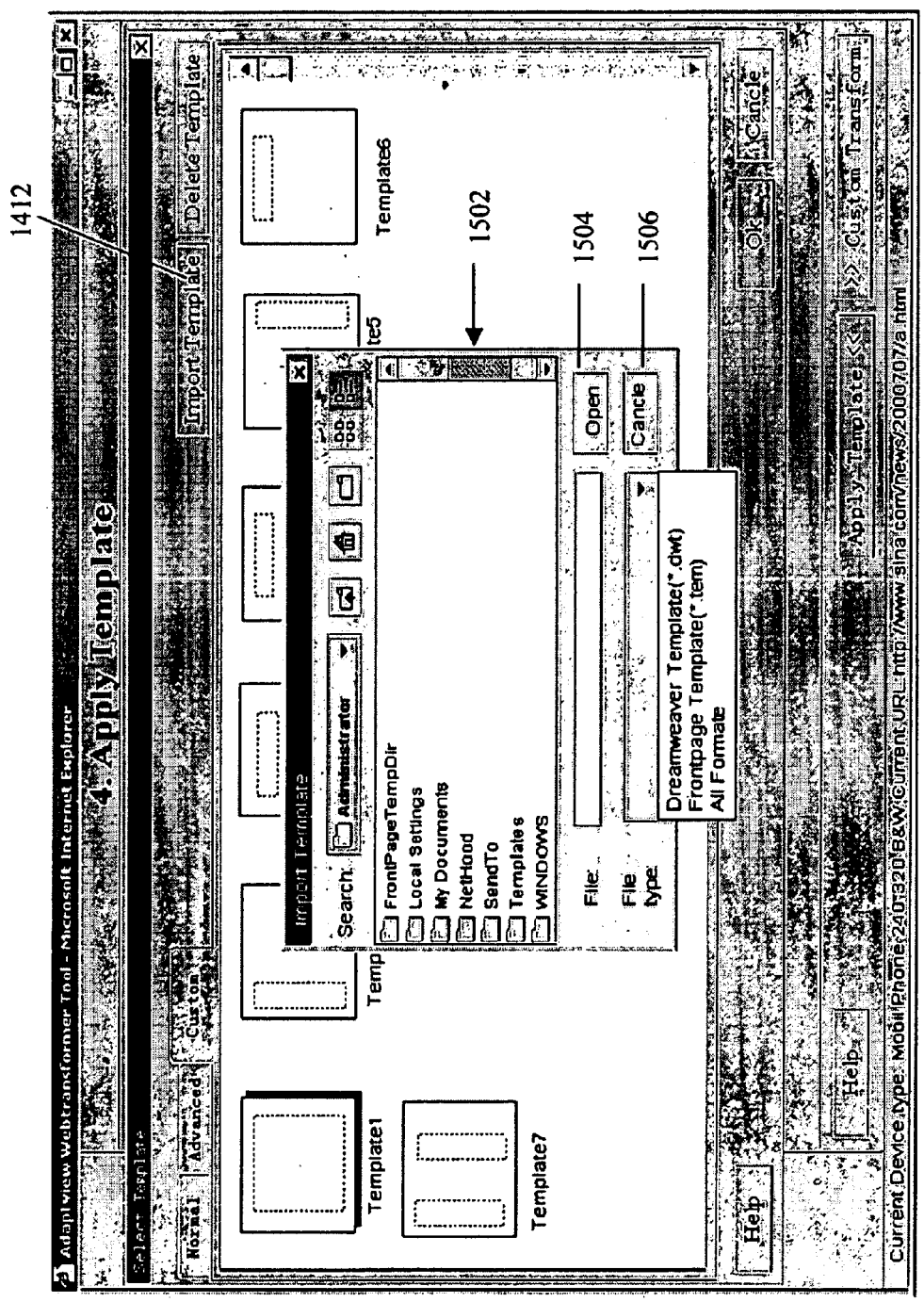
FIG. 15 is a display screen, according to one aspect of the present invention, associated with importing a template for use with the editor.

Referring now to FIG. 15, the button 1412 labeled "Import Template" invokes the representative Import Template screen 1502. The user can select a file that corresponds to an editor-created template from a local directory. Example file type formats are selected via a dropdown menu, and might include Dreamweaver files with a template extension ".dwt," and Frontpage files with a template extension ".Tem." The "Open" button 1504 opens the Custom Transform window (see below). The "Cancel" button 1506 closes the Import Template window.

Figure 16A:
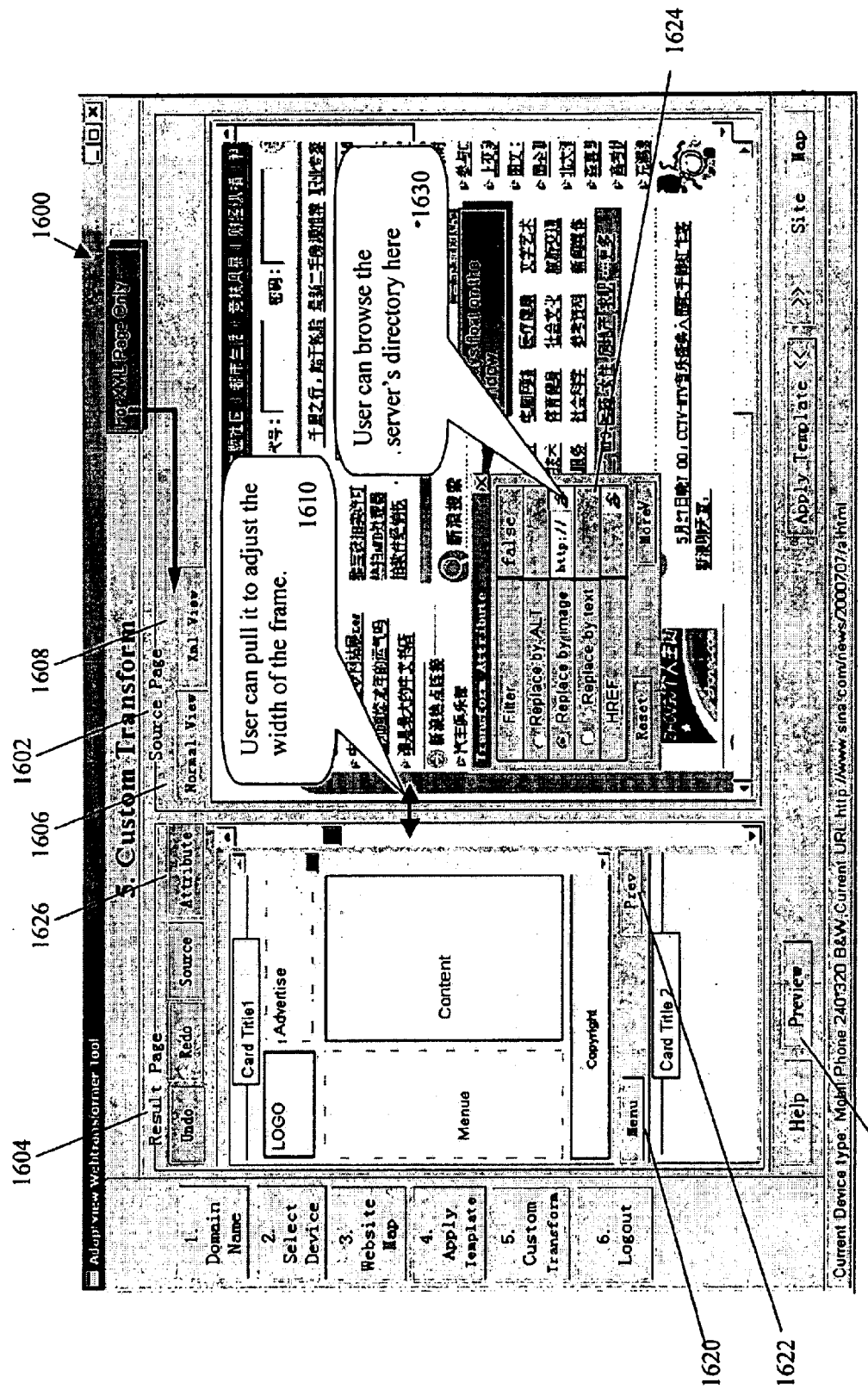
FIG. 16A is a display screen, according to one aspect of the present invention, which shows a source page and result page on a custom transform area.
Figure 16B:
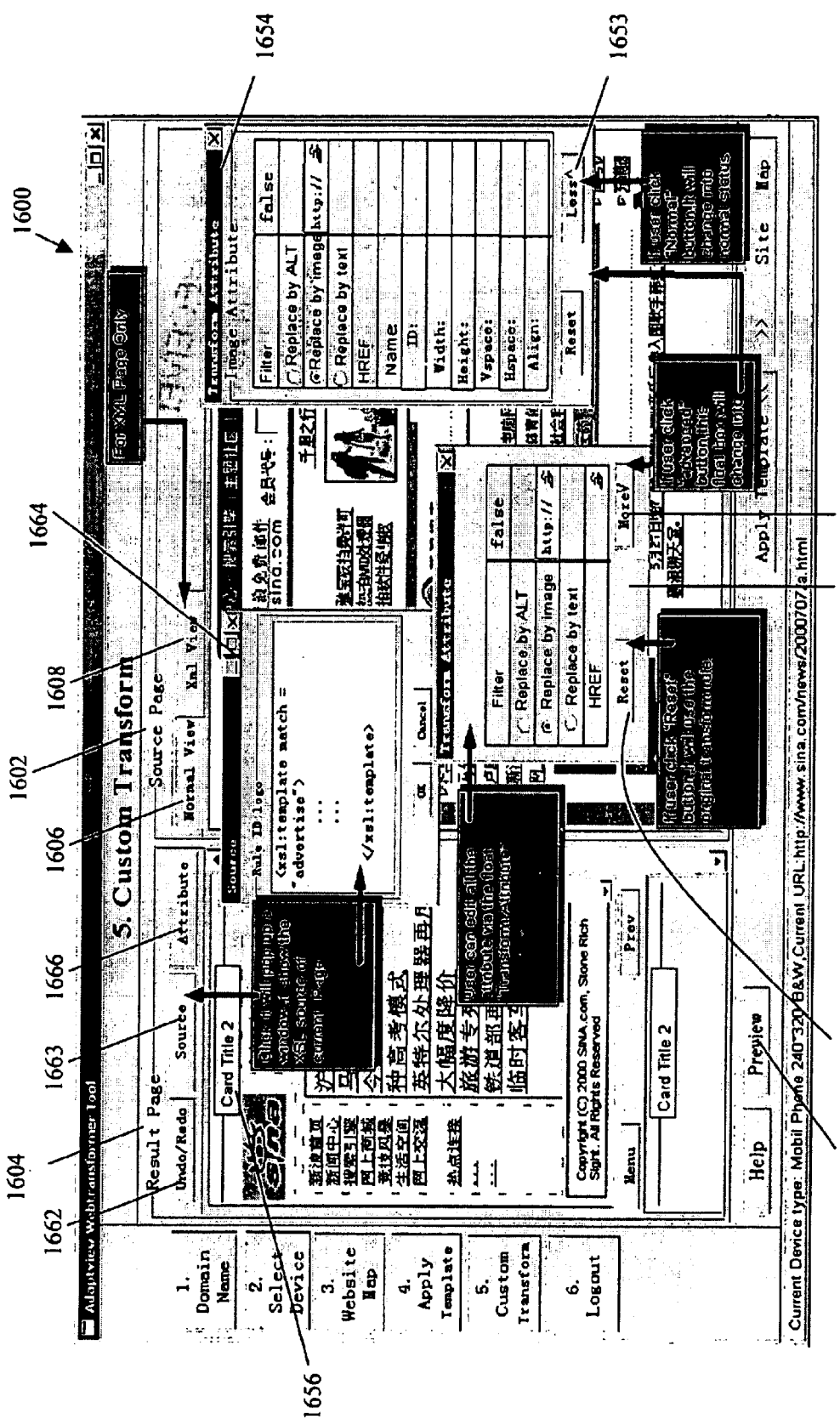
FIG. 16B is a display screen, according to one aspect of the present invention, which further shows the result of clicking on various buttons on the custom transform area.

The fifth step pertains to the customized transformation of the source page to the result page (i.e., element 510 in FIG. 5). FIGS. 16A and 16B show yet another version 1600 of the graphical editor (similar to FIG. 3), with additional features shown and described. Referring first to FIG. 16A, the source page 1602 is shown on the right of the display, and the result page 1604 is shown on the left. A pair of tabs exist at the top of the Source page 1602, with these tabs switching between a Normal View 1606 and XML View 1608 of the source content information. The dimensions of the Source page 1602 and/or Result Page 1604 can be adjusted by resizing the distance of the frame wall between the Source Page and the Result Page, as shown by the arrow 1610.

The Source Page is analyzed and separated into elements, with an identifier being associated with each element. The page selected is shown as an HTML file, similar to that in a web browser. The users, however, cannot generally click on the associated hyperlinks. If the user clicks on an item, the item will be highlighted. The item will generally stay highlighted, until the user clicks on another area that will then take over as the highlighted item. The user can then mouse-drag this area to the Result Page 1604 (also referred to as the Edited Page).

Different templates will handle the drag-and-drop operation differently depending upon the capabilities of the receiving device. For an HTML device, the Result Page shows the template that the user selected. All such templates supplied by the program do not generally have static areas, and all areas in the templates can accept drop events. Static areas can not be updated so they are not highlighted for drop events. The window might also have an empty page below the current page. When the pages are finished, the empty page will be automatically cut. Additionally, the pages will generally have the same layout as the template the user selected.

For an WML device, the Result Page again generally shows the template the user selected. The templates supplied by the program have no static areas, and all areas in the templates can accept drop events. If a template that a user has imported has static areas, then only those that are dynamic can accept drop events. The window might also include an empty card below the current card. When the deck is finished, the empty card will be automatically cut. Additionally, the cards will generally have the same layout as the template selected by the user. The button "Menu" 1620 (generally for WML devices only) is the left button on a mobile phone. If the user clicks on this button, the attribute window 1624 will allow a user to add items (links or events) depending upon the capability of the device type. The button "Prev" 1622 (also generally for WML devices only) is the right button on a mobile phone. If the user clicks on this button, the attribute window will allow users to add items (links or events) depending upon the capability of the device type.

If a user clicks on any element in the Result Page 1604, the floating window 1624 will show the attributes of this element. The user can freely edit all of the attributes in the list. The edit will take effect when the floating window is not at the focus of the user. The user can then see the results in the Result Page 1604. The attribute window is opened by default. If the user closes this window and wishes to retrieve it, then clicking the "Attribute" button 1626 in the Result Page field set will reopen the window.

Referring now to FIG. 16B, the Source Page 1602 and Result Page 1604 are again shown, with the Floating Attribute window 1624. If the user clicks on the "Reset" button 1650, then all default values will reappear, and the original transform rule will be used. If the user clicks on the "MoreV" button 1652, then the floating box will change into 1654 to show more advance attributes of the current element, and the "MoreV" button 1652 will change into the "Less^" button 1653. If the user clicks the card title 1656 (for WML devices), the attribute window will show the attributes of a card (such as card ID, card title, and card label). If the user clicks the title of a page (for HTML device, the title will be shown in the same position as card), then the attribute window will show the attribute of a body.

As described briefly above, the user can select an item and drag it into the Result Page 1604. If the particular area will accept a drop, then the cursor can change to indicate the acceptance ("accepted cursor"). If the area cannot accept the drop event, then the cursor will appear as an "unaccepted cursor." If the area can accept a drop, then it can be marked with "+" symbol. Once the drop even occurs, the Result Page 1604 will change its font, size, and so forth in accordance with the last result on the real device. Additionally, the floating attribute window 1624 will show the attributes of this content. If the user is not satisfied with the result, then the user can modify it in the attribute window, or click on the button "Undo" 1658.

A Device Capability Default Rule (or the like) is used to match the content that the user drops. If the number of characters is beyond the limit, then certain options will be presented to the user. The user can drop items at absolute locations by using the CTRL (control) key (or the like). However, this action generally works only in devices that support CSS Absolute location. The attribute window will also contain the capability for absolute location drops.

Certain actions can also be performed in the Results Page 1604, wherein areas can be selected as in the Normal View 1606 of the Source Page 1602. An attribute window will show the attributes of this area. Blocks can be dragged and dropped as many times as the user desires. In addition, sub-blocks can also be dropped, wherein the smallest possible block is pair of tags (i.e., <tag><tag/>). Moreover, the template frames can be adjusted, and blocks can be dragged from one frame to another. Example actions for the result page might include:

1. Insert before—inserts an element before a pair of tags.
2. Insert after—inserts an element after a pair of tags.
3. At Absolute—drop at an absolute location by pressing CTRL.
4. Filter—filter an element via floating attribute window.
5. Replace—replace an element (user can click on an element, replace it via the attribute window, and drop it by pressing Shift).
6. Change Attribute—change the attribute of an element via attribute window.
7. Change Text Value—change the text value via attribute window.
8. Insert Front—insert an element in front of a pair of tags.
9. Insert Back—insert an element in back of a pair of tags.
10. Resize Image—resize an image by dragging the corner of the image, dragging the border, and/or modifying the data in the attribute window.
11. Cut Image—cut an image by dragging the corner while pressing CTRL.
12. For devices which support <div> or table (width and height), users can resize the width and height.

Referring again to FIGS. 16A and 16B, if the user clicks on the "Preview" button 1660, the resulting page—created by a simulator device for showing how the display will appear on the resulting display device—will appear in a new browser window. In this instance, the user can click on hyperlinks in the simulator. If they link to a page which has not yet been customized, then that page can be transformed via default rules. At the same time, a message page will inform the user that the page has not yet been customized.

The button "Undo/Redo" 1662 can be used to undo various actions including (1) drag and drop actions, (2) Actions from the attribute window, and (3) Actions from the Result Page. The button "Source" 1663 provides a window 1664 with the XSLT source code of the current page/deck. The button "Attribute" 1666 reopens the attribute window 1624. Clicking on the button "Site Map" indicates that the page has been completed and thereafter loads the Site Map window (see FIG. 11). The button "Apply Template" cancels all actions and returns to the previous window (see FIG. 15). A warning message is provided to the user, indicating that all customizations for this page will be lost. If the user affirms, then the customization will be lost and the page will appear to be uncustomized (i.e., red in color) on the Site Map. The Apply (or Select) Template window (see FIG. 13) will then appear. Otherwise, the user might cancel the loss of the customizations.

Note again that for the Source Page 1602, a Normal View tab 1606 and an XML view tab 1608 are provided. When pulling up a source page, the Normal View generally appears first, and then the transform result of the original XML and XSL appears (i.e., HTML file is the transform result of a WML file). The user can thereafter drag and drop any content desired.

Figure 17:
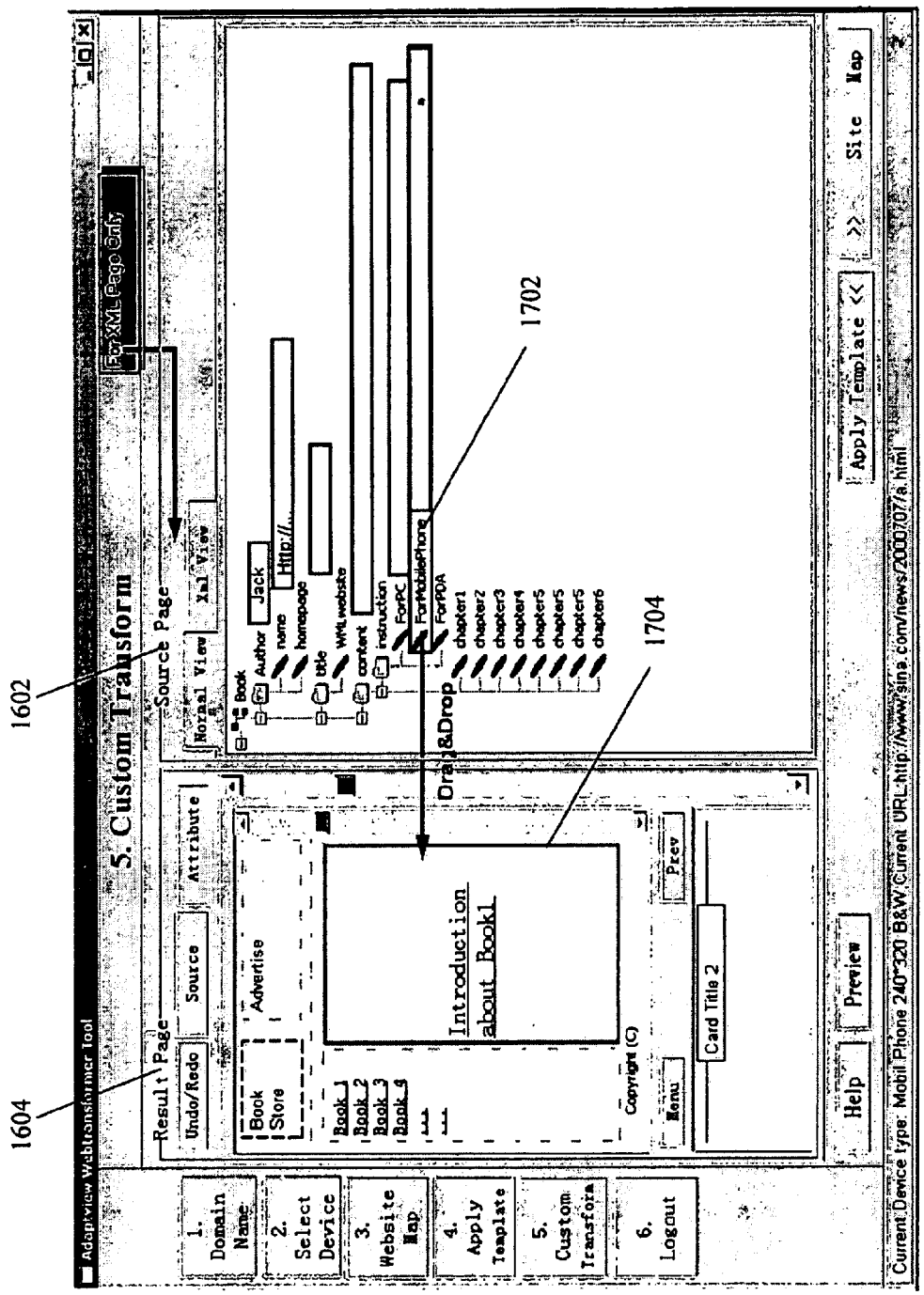
FIG. 17 is a display screen, according to one aspect of the present invention, which shows a hierarchical list of node objects that can be associated with template areas on the result page.
Figure 18A:
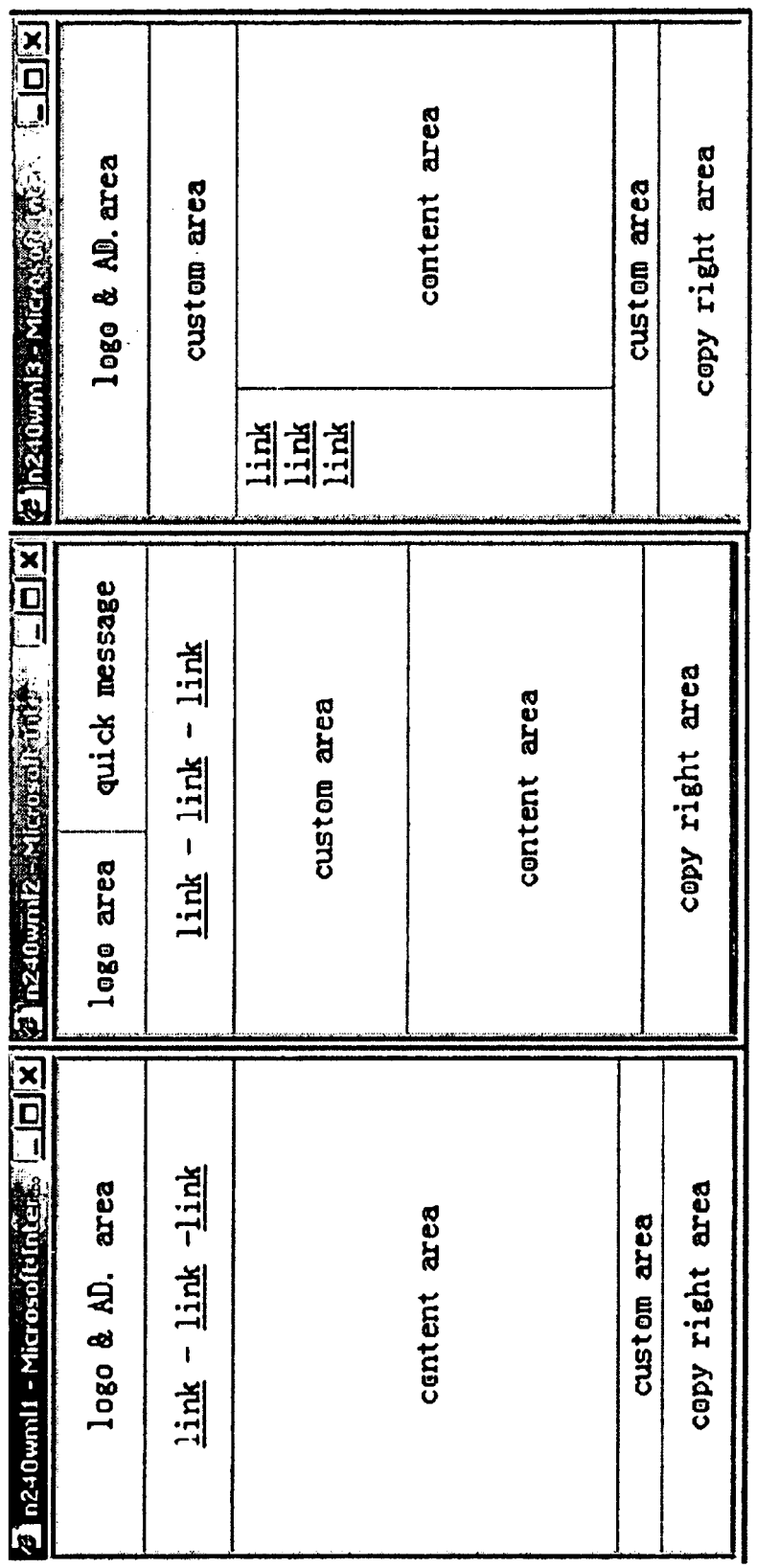
FIGS. 18A–18D are display screens, according to one aspect of the present invention, which show example templates associated with one size of display capability on the receiving device.
Figure 18B:
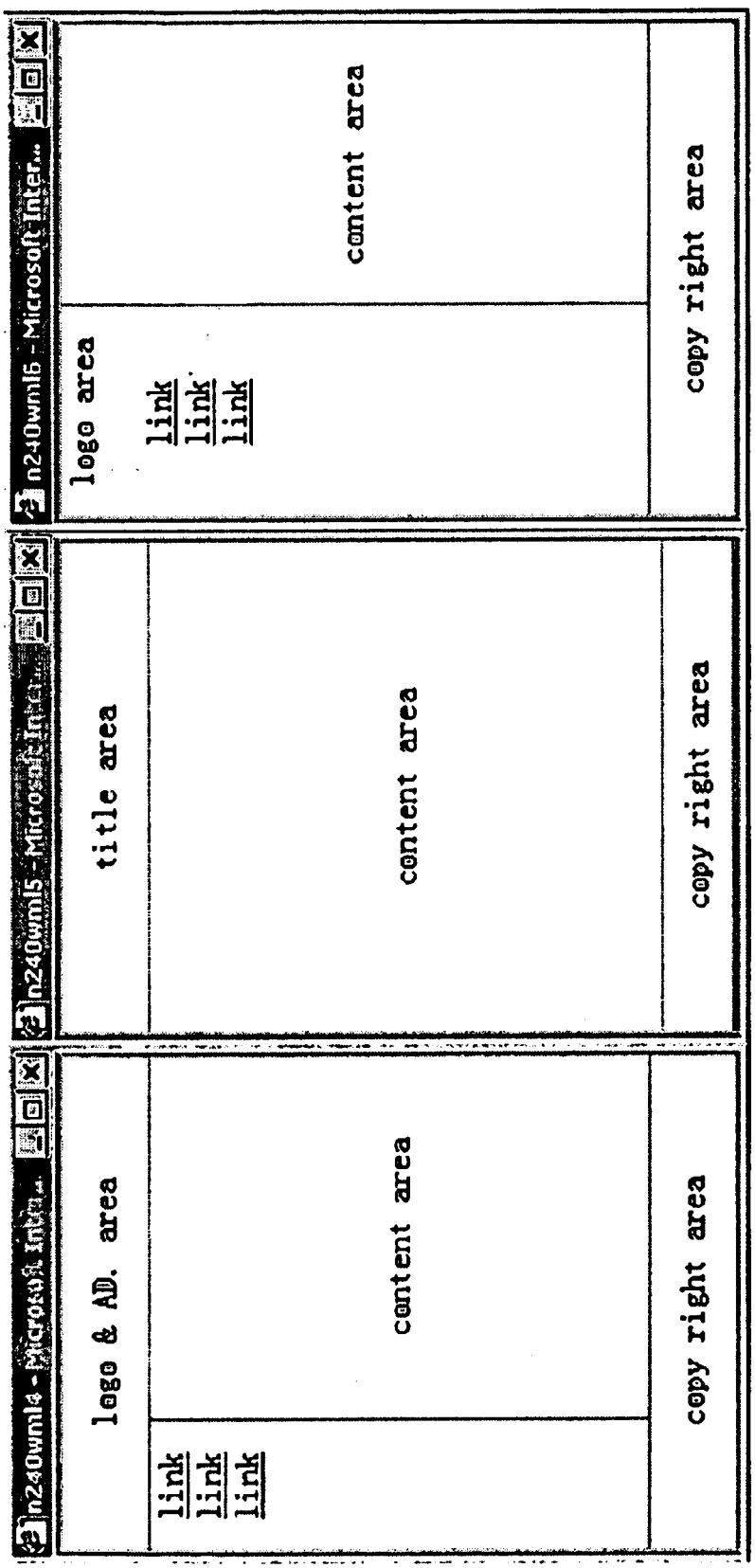
Figure 18C:
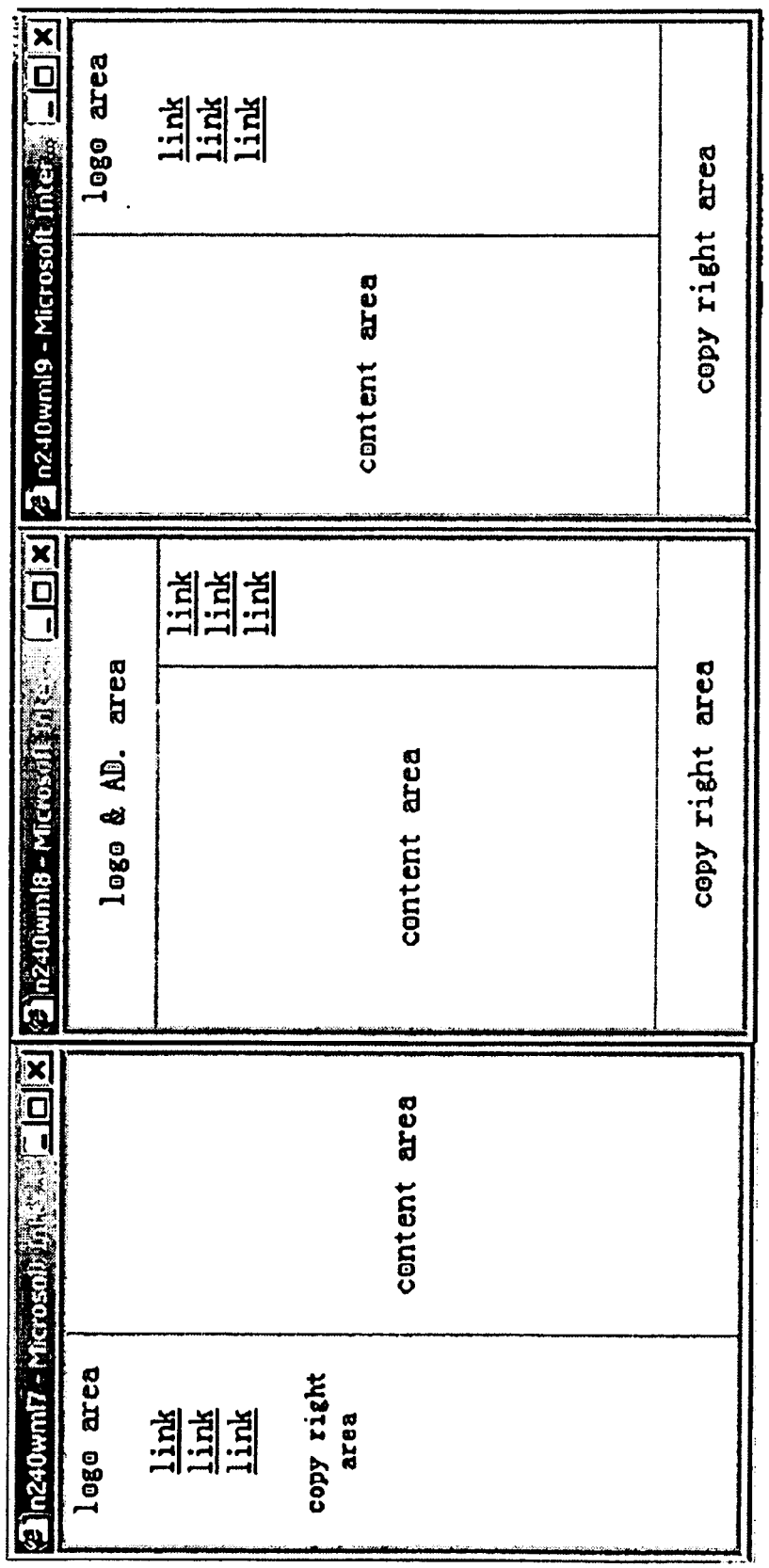
Figure 18D:
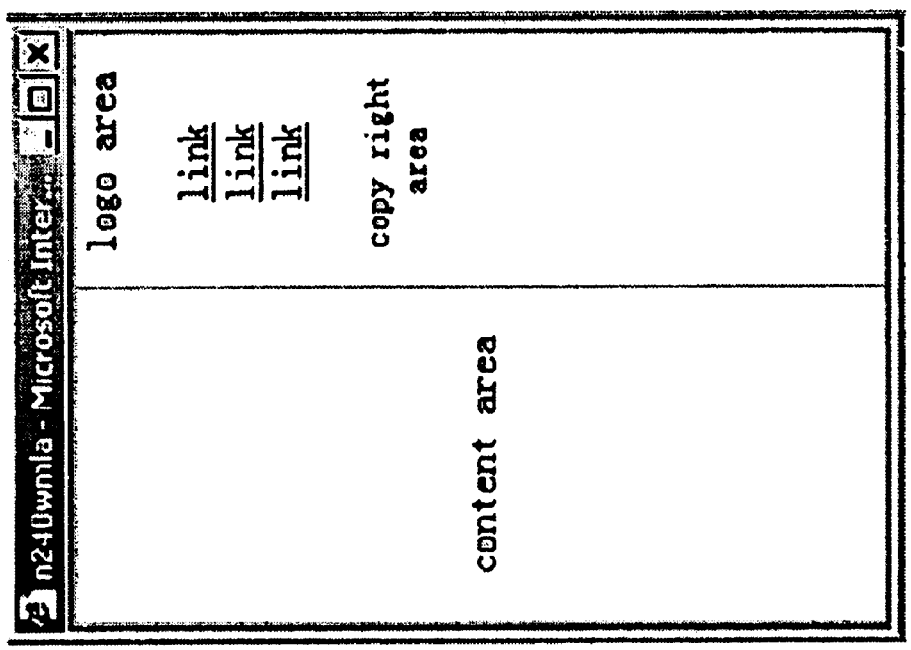

Referring now to FIG. 17, if the user wishes to drag items from an XML document, then the XML view tab can be selected, upon which the Normal View will change into XML View. An example XML view (with various nodes) is shown in the Source Page area 1602. The user can open a node or close a node (but the display will not show the source code of the XML). The user can drag and drop nodes of every level in XML, with a default XSLT being written to match the node. If the program recognizes a link, image, or the like, then it will add the code <a>, <img>, or show plain text. Note that different devices have different XSLT. For example, if there is Flash animation in the XML, and the device type supports it, then the program will show Flash. The user can edit the appearance of the content via the attribute window.

If the user clicks on a node, i.e. 1702, in the XML view, then this node will be highlighted. The item will remain highlighted until another is selected. The user can thereafter drag this node to the Result Page 1604. In this example, the Result Page template includes an area 1704 for "Introduction about Book1." The node "ForMobilePhone" 1702 will be placed into this Result Page 1604 from the XML view. If the user has done nothing prior to leaving the page, then an appropriate message will be provided inquiring if the user wants to mark the area as customized or uncustomized.

Figure 19A:
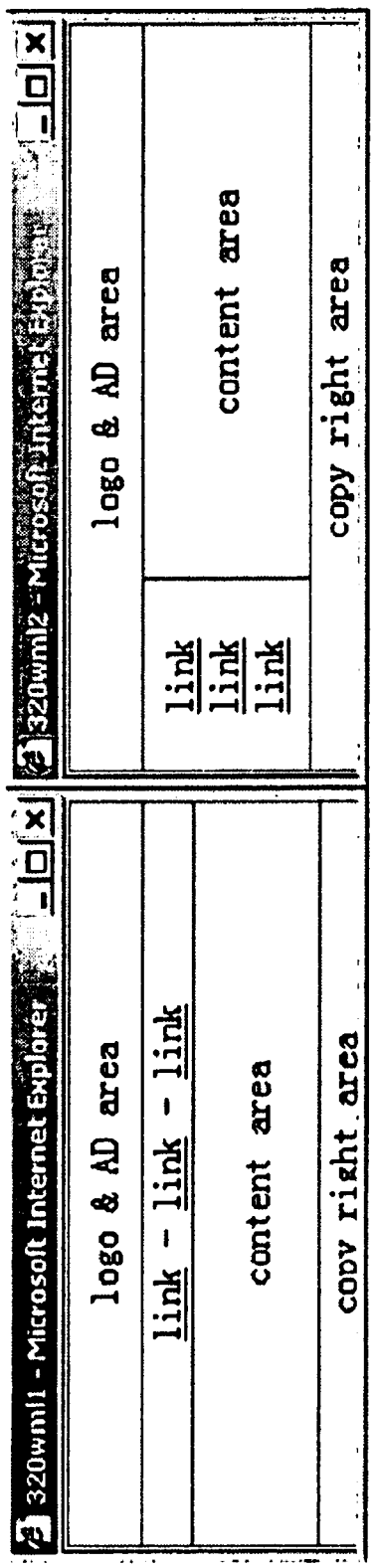
FIGS. 19A–19B are display screens, according to one aspect of the present invention, which show example templates associated with another size of display capability on the receiving device.
Figure 19B:
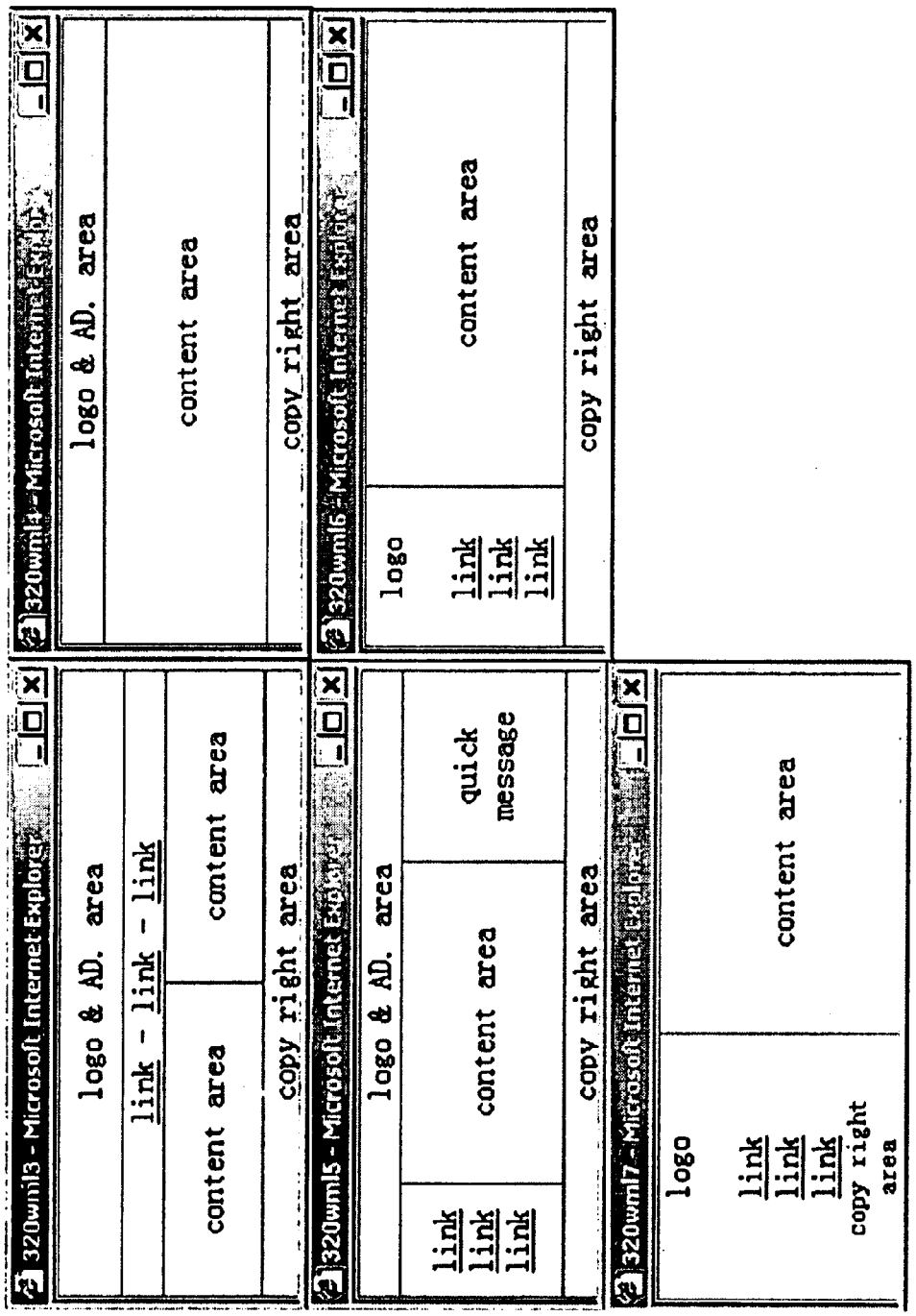

In order to facilitate faster transformation of source content to result content, various templates are available for use in the Result Page 1604. Such templates include (for instance): logo and advertisement areas, quick message areas, link areas, content areas, custom areas, and copyright areas. FIGS. 18A–18D show a set of example templates for a 240x320 pixel display capability (for both WML and HTML devices). FIGS. 19A–19B show a set of example templates for a 320×120 pixel display capability (for both WML and HTML devices).

Figure 20:
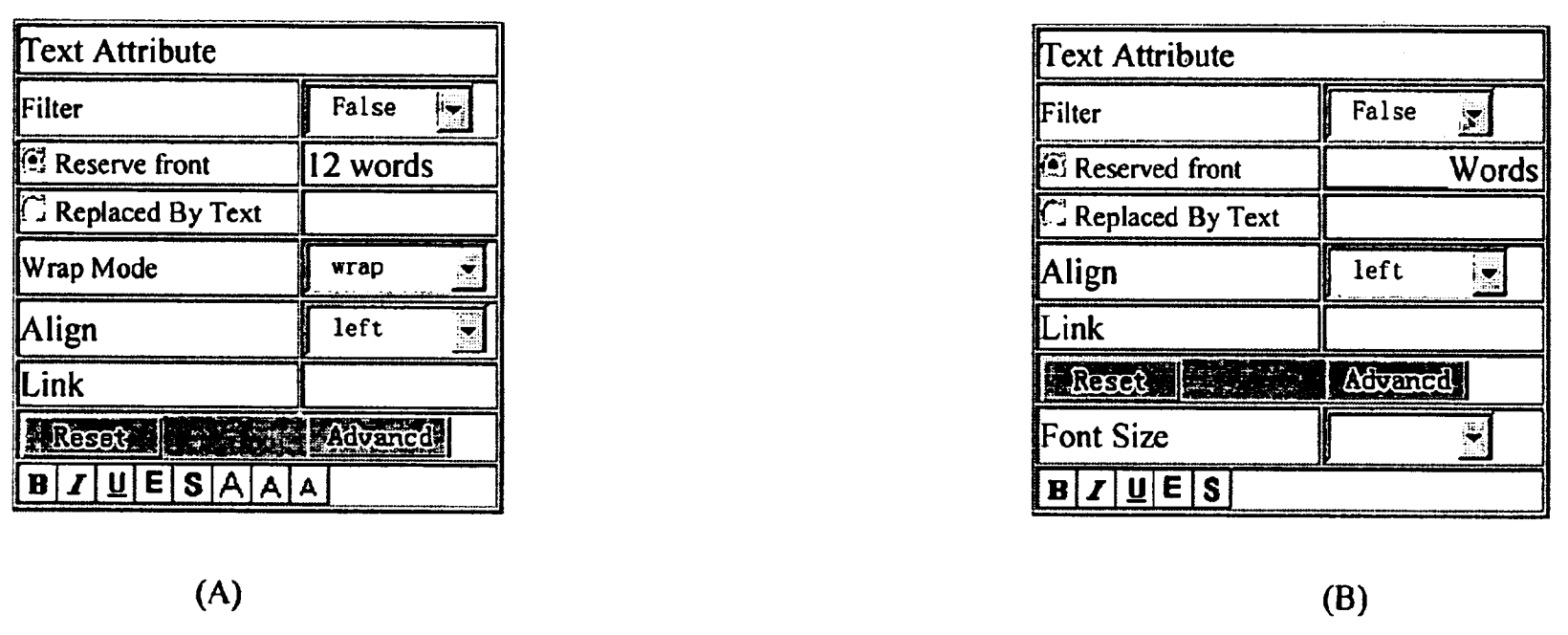
Figure 23:
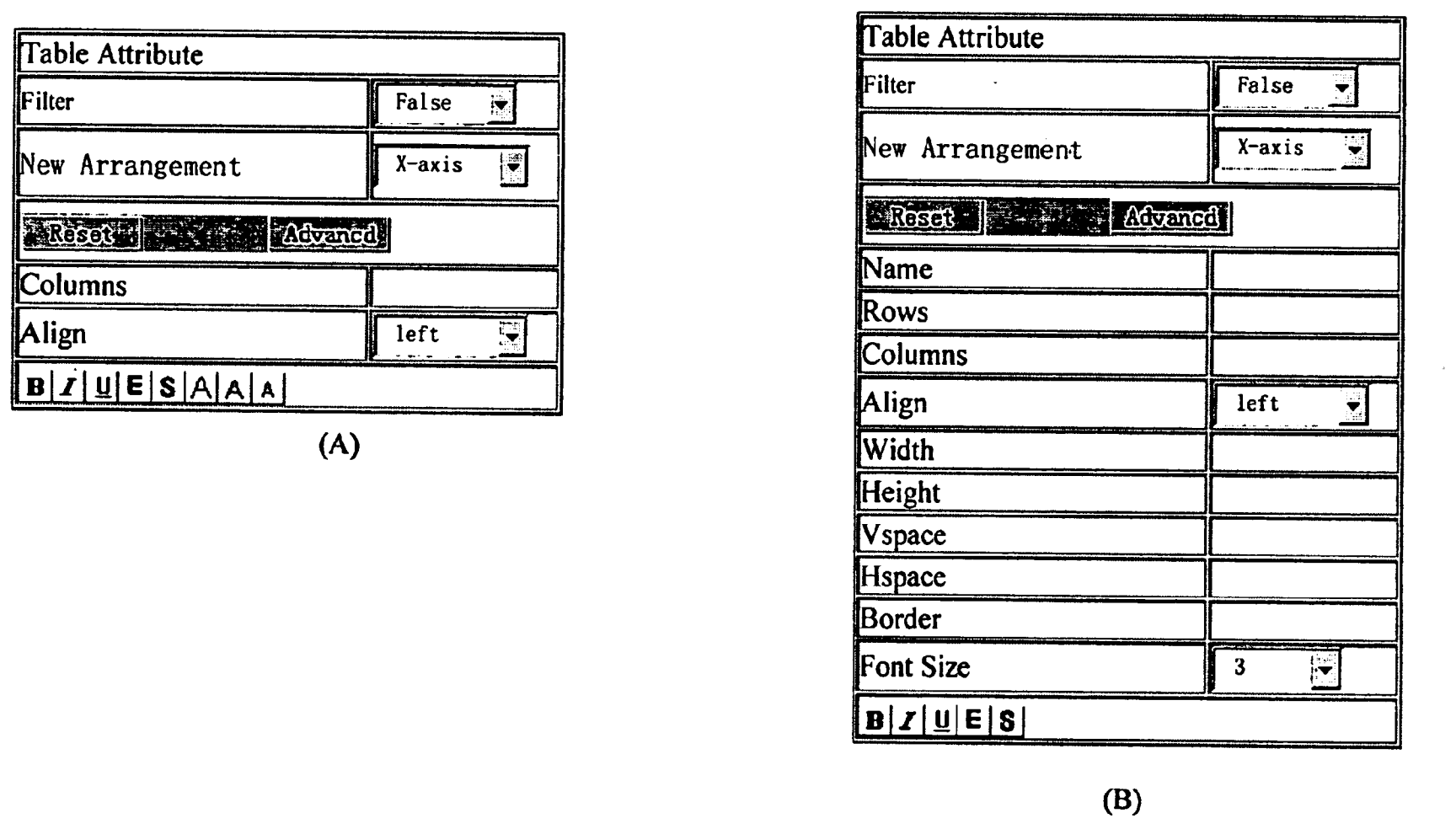
Figures 24, 25:
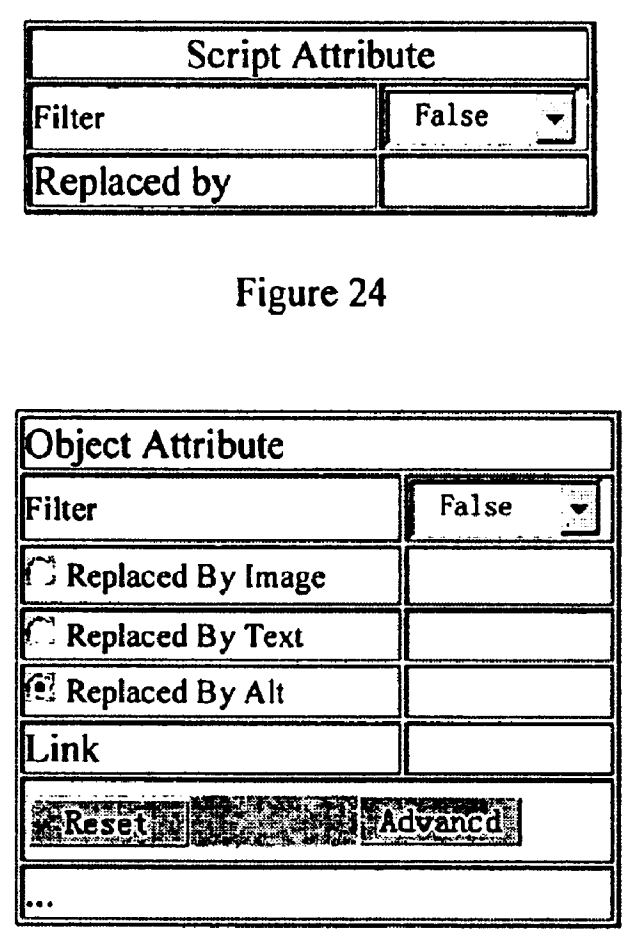
Figure 26:
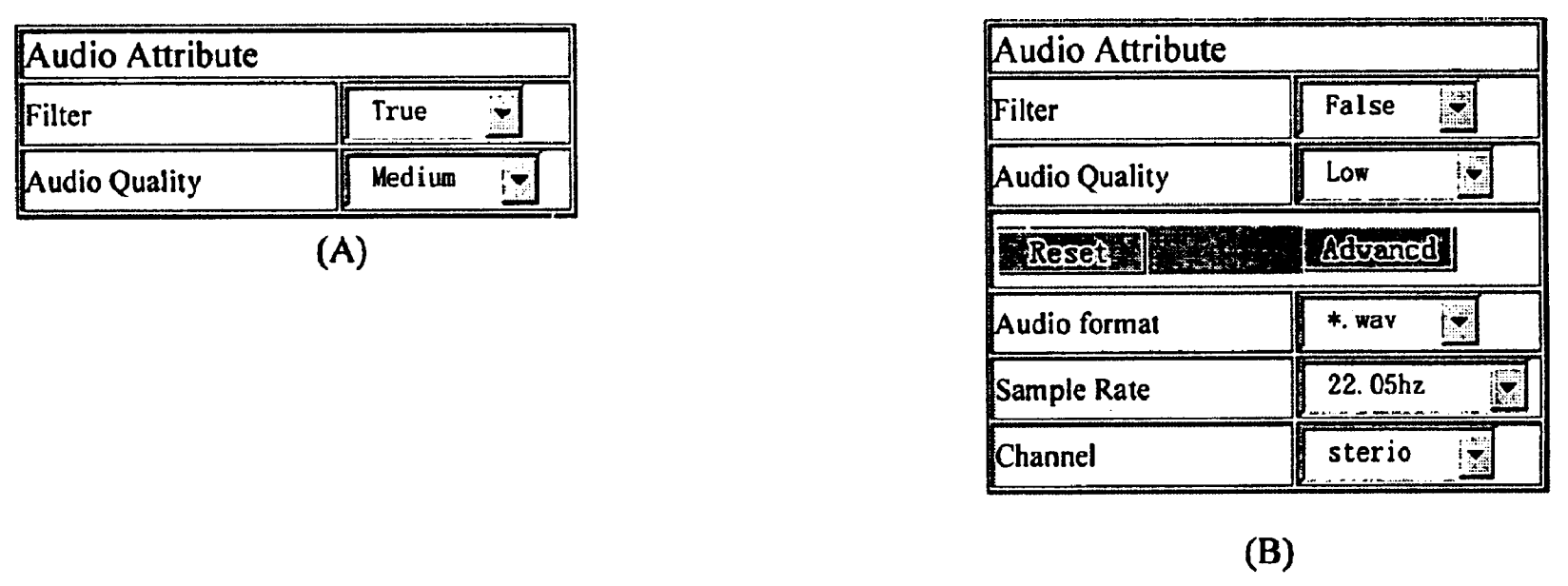

Different transform attribute windows will also need to be provided, given that the window will change based upon the Result Page format. A set of example windows includes the following: FIGS. 20A–20B, text attribute windows for WML and HTML respectively. FIGS. 21A–21B; image attribute windows for WML and HTML respectively; FIGS. 22A–22B, "Hot Spot" map image link attribute windows for WML and HTML respectively; FIG. 22C, map attribute window for HTML; FIGS. 23A–23B, table attribute windows for WML and HTML respectively; FIG. 24, a script attribute window for both WML and HTML; FIG. 25, an object attribute window for both WML and HTML; FIG. 26A–26B, an audio attribute window for WML and HTML respectively.

What is claimed is:

1. An apparatus for the generation and application of a set of rules to transform source content into result content for a content receiving device, the apparatus comprising:
   a source content area for retrieving the source content;
   an analyzer for identifying separate elements within the source content and assigning an identifier to each element;
   a result content area providing selective placement of the elements according to a desired layout;
   a rule generator for generating a set of transformation rules for transforming the source content into the result content according to their selective placement; and
   an application device for applying the transformation rules to the source content that is requested by the content receiving device.

2. The apparatus according to claim 1, wherein the source content area and result content area are part of a graphical editing tool.

3. The apparatus according to claim 2, wherein editing tools provide for graphical placement of source content from the source content area into the result content area as result content.

4. The apparatus of claim 2, wherein the graphical editing tool is running on a design station device.

5. The apparatus of claim 4, wherein the design station device is in communication with the application device in order to provide the transformation rules.

6. The apparatus according to claim 1, wherein a storage device is used to store the transformation rules for access by the application device.

7. The apparatus of claim 1, wherein the application device is a server device.

8. The apparatus of claim 7, wherein the server device is a proxy server device that receives a request for source content, retrieves the source content from a corresponding web server device, and transforms the source content to result content according to the transformation rules.

9. The apparatus of claim 1, wherein the source content and result content includes web page information, and the content receiving device is a web enabled device.

10. An apparatus for automatic generation of transform rules for use in displaying web content information on web enabled devices having different display capabilities, the apparatus comprising:
    at least one web site having web content information for display on the different web enabled devices;
    at least one proxy server device;
    at least one design station in communication with the at least one proxy server device;
    a web page editor running on the at least one design station, whereby a source web page is retrieved and the layout of a result web page is formed according to the different device capabilities; and
    a rule generator associated with the web page editor for generating a set of transform rules to convert the source page to the result page, the transform rules being communicated to the at least one proxy server device,
    wherein the web enabled devices request information from the at least one web site through the at least one proxy server which applies the transform rules to the requested information.

11. The apparatus according to claim 10, wherein the web page editor includes a source content area and result content area as part of a graphical design tool having editing tools.

12. The apparatus according to claim 11, wherein the editing tools provide for graphical placement of source content from the source content area into the result content area as result content.

13. The apparatus according to claim 12, wherein a storage device is used to store the transformation rules for access by the proxy server device.

14. A graphical design apparatus for transforming source content to result content according to the display capabilities of a result content receiving device, the apparatus comprising:
    a first display area for displaying the source content;
    a second display area for displaying the result content,
    a set of graphical tools whereby the source content can be graphically moved with the tools from the first area to the second area to form a result layout; and
    a rule generator for generating a set of transformation rules to transform the source content to the result layout, the rules being formed according to use of the graphical tools and the result layout.

15. The graphical design apparatus of claim 14, which further includes an analyzer that separates the source content into elements and assigns an identifier to each element for use by the graphical tools.

16. The graphical design apparatus of claim 14, which further includes a proxy server device for applying the set of transformation rules to the source content to form the result content when the source content is requested by the result content receiving device.

17. The graphical design apparatus of claim 16, wherein the proxy server device retrieves source content from server devices according to requests from the result content receiving device.

18. The graphical design apparatus of claim 17, wherein the rule generator is in communication with the proxy server device.

19. The graphical design apparatus of claim 18, wherein the communication includes a network link.

20. The graphical design apparatus of claim 19, wherein the network link includes the Internet.

21. The graphical design apparatus of claim 18, wherein the communication includes a wireless link.

22. A method for providing information content according to the capabilities of a receiving device, the method comprising:
    retrieving source information content;
    arranging result information content from the source information content according to the capabilities of the receiving device;
    generating transformation rules according to the transformation between the source information content and the result information content; and applying the appropriate transformation rules to the source information content when the content is requested by the receiving device.

23. The method according to claim 22, wherein the arranging step uses a graphical editor with a set of graphical editing tools for arranging the result information.

24. The method according to claim 23, wherein the graphical editor displays the source information content in one area and the result information content in another area, and the source information content is selectively placed in the result display area.

25. The method according to claim 22, which further includes: analyzing the source information content for elemental components and assigning an identifier to each element.

26. The method according to claim 22, which further includes: providing for selectable templates in the result display area to facilitate layout of the result information content.

* * * * *